(12) United States Patent
Chen et al.

(10) Patent No.: US 11,791,735 B2
(45) Date of Patent: Oct. 17, 2023

(54) DC-DC CONVERTER, BIDIRECTIONAL DC-DC CONVERTER AND CONTROL METHOD

(71) Applicant: Infineon Technologies Austria AG, Villach (AT)

(72) Inventors: Yue Chen, Shenzhen (CN); Elvis Wei Shi, Villach (AT); Sanbao Shi, Shenzhen (CN); Tangshun Wu, Shenzhen (CN)

(73) Assignee: Infineon Technologies Austria AG, Villach (AT)

( * ) Notice: Subject to any disclaimer, the term of this patent is extended or adjusted under 35 U.S.C. 154(b) by 129 days.

(21) Appl. No.: 17/536,378

(22) Filed: Nov. 29, 2021

(65) Prior Publication Data
US 2022/0173669 A1    Jun. 2, 2022

(30) Foreign Application Priority Data

Nov. 27, 2020   (CN) .......................... 202011357076.1

(51) Int. Cl.
*H02M 3/335*    (2006.01)
*H02M 1/00*    (2006.01)
*H02M 1/08*    (2006.01)

(52) U.S. Cl.
CPC ..... *H02M 3/33584* (2013.01); *H02M 1/0009* (2021.05); *H02M 1/08* (2013.01); *H02M 3/33573* (2021.05)

(58) Field of Classification Search
CPC ......... H02M 3/33573; H02M 3/33584; H02M 1/0009; H02M 1/0008

(Continued)

(56) References Cited

U.S. PATENT DOCUMENTS 10,811,868 B2 * 10/2020 Zhou ..................... H02M 1/083
2011/0038182 A1    2/2011 Li et al.
(Continued)

FOREIGN PATENT DOCUMENTS

EP        2887520 A1    6/2015
WO    2019206230 A1    10/2019

OTHER PUBLICATIONS

Li, Haoran, et al., "Bidirectional Synchronous Rectification On-Line Calculation Control for High Voltage Applications in SiC Bidirectional LLC Portable Chargers", IEEE Transactions on Power Electronics, vol. 36, No. 5, May 2021, pp. 5557-5568.

*Primary Examiner* — Yemane Mehari
(74) *Attorney, Agent, or Firm* — Murphy, Bilak & Homiller, PLLC

(57) ABSTRACT

A DC-DC converter includes: a transformer; first and second switching circuits, each coupled to one of two sides of the transformer, respectively, and each including at least two switches; a first current detection module, coupled to one side of the transformer and detecting a current at the side; a first conversion module, coupled to an output of the first current detection module, and converting a signal of the current received from the output to a voltage signal; a first comparison module comparing the voltage signal received from the output with a reference voltage signal, and generating a first modulation signal based on the comparison result; and a first controller generating a first control signal which is used for at least one switch in the second switching circuit and based on the first modulation signal and a drive signal of at least one switch in the first switching circuit.

21 Claims, 19 Drawing Sheets

(58) Field of Classification Search
USPC .......................................................... 363/17
See application file for complete search history.

(56) References Cited

U.S. PATENT DOCUMENTS

2019/0207520 A1* 7/2019 Imade ................... H05B 45/395
2020/0366212 A1* 11/2020 Chan ..................... H02M 1/083

* cited by examiner

DC-DC CONVERTER, BIDIRECTIONAL DC-DC CONVERTER AND CONTROL METHOD

TECHNICAL FIELD

The content of the present disclosure relates to the field of electronic circuits, in particular to a direct current to direct current (DC-DC) converter.

BACKGROUND

At present, CLLCs (resonant isolated bidirectional DC-DC converters) are widely used in EV (electric vehicle), charging station and OBC (on-board charger) applications. FIG. 1 shows a circuit topology of a CLLC. In the circuit as shown in FIG. 1, for example, a CoolSiC™ MOSFET (metal oxide semiconductor field effect transistor) integrating a body diode having p-n junction characteristics can be used. Since the body diode of the MOSFET has high power consumption, the system will have low efficiency. In particular, in the case of full load under low output voltage conditions, a higher output current will result in greater energy consumption, and consequently the junction temperature of the device will become unacceptable.

In the topology shown in FIG. 1, if a positive bias of +15 V for example is applied to the gate of the MOSFET, the MOSFET can conduct a reverse current from the source to the drain through the channel. This mode of operation is called synchronous rectification (or third quadrant operation). However, in such a topology, it is difficult to achieve satisfactory synchronous rectification.

FIG. 2 shows a circuit diagram of an existing synchronous rectification solution. As shown in FIG. 2, a secondary-side rectifier comprises MOSFETs Q5, Q6, Q7 and Q8. A comparator 101 is configured to detect $V_{DS}$ of MOSFET Q8, and when $V_{DS}$ of MOSFET Q8 is close to zero, a logic signal of an output voltage Vu1.out of the comparator 101 will change to LOW. An AND gate 102 detects Vu1.out, and compares it with a drive voltage Vgs.Q4 that is supplied from another controller to a driver 105 for MOSFET Q4, then outputs a drive voltage Vgs.Q8 for the gate of MOSFET Q8 to a driver 104 or outputs a drive voltage Vgs.Q5 for the gate of MOSFET Q5 to a driver 103. FIG. 3 shows synchronous rectification waveforms in the circuit shown in FIG. 2, wherein the upper graph is the synchronous rectification waveforms when a frequency fs of a PWM (pulse width modulation) signal is less than an oscillation frequency frl of a resonant circuit formed by L1, C2 and parasitic magnetizing inductance of a transformer T1, and the lower graph is the synchronous rectification waveforms when the PWM frequency fs is greater than the oscillation frequency frl. As shown in FIG. 3, when Vu1.out outputted by the comparator 101 is LOW, or the gate voltage of MOSFET Q4 is LOW, the gate drive voltage of MOSFET Q8 will be LOW. When Vu1.out outputted by the comparator 101 is HIGH, and the gate voltage of MOSFET Q4 is also HIGH, the gate drive voltage of MOSFET Q8 will be HIGH.

The DC-DC converter as shown in FIG. 2 can effectively synchronize the secondary-side MOSFETs by collecting the $V_{DS}$ voltages of the secondary-side MOSFETs. However, as shown in FIG. 3, before the body diode of the MOSFET conducts, multiple oscillations might occur in the falling edge of the $V_{DS}$ signal; this is because the parasitic inductance and transformer leakage inductance in the DC-DC converter topology will resonate with the MOSFET junction capacitance, and since the MOSFET junction capacitance is generally very small, even a very small current will cause a high voltage of the junction capacitance. Thus, this resonance energy causes the $V_{DS}$ signal to repeatedly cross zero, resulting in repeated switching of the MOSFET off and on. In addition, if the design of the filter or PCB (printed circuit board) layout is not ideal, faults are easily triggered.

SUMMARY

A brief summary of the content of the present disclosure is given below, in order to provide a basic understanding of certain aspects of the content of the present disclosure. It should be understood that this summary is not an exhaustive summary of the content of the present disclosure. It is not intended to determine key or important parts of the content of the present disclosure, nor is it intended to define the scope of the content of the present disclosure. It is merely intended to put forward some concepts in simplified form, to serve as an introduction to the more detailed description that will be discussed later.

According to one aspect of the present invention, a DC-DC converter is provided, comprising: a transformer; a first switching circuit and a second switching circuit, each coupled to one of two sides of the transformer respectively, and each comprising at least two switches; a first current detection module, coupled to one side of the transformer and detecting a current at said side; a first conversion module, coupled to an output of the first current detection module, and converting a signal of the current received from the first current detection module to a voltage signal; a first comparison module, coupled to an output of the first conversion module, and comparing the voltage signal received from the first conversion module with a reference voltage signal, and generating a first modulation signal on the basis of the comparison result; and a first controller, coupled to an output of the first comparison module, and generating a first control signal for at least one switch in the second switching circuit, the first control signal being based on the first modulation signal and a drive signal of at least one switch in the first switching circuit.

Preferably, the DC-DC converter further comprises a first driver, which is coupled to the first controller and drives at least one switch in the second switching circuit on the basis of the first control signal received from the first controller.

Preferably, the DC-DC converter further comprises: a second current detection module, coupled to the other side of the transformer and detecting a current at said other side; a second conversion module, coupled to an output of the second current detection module, and converting a signal of the current received from the second current detection module to a voltage signal; a second comparison module, coupled to an output of the second conversion module, and comparing the voltage signal received from the second conversion module with the reference voltage signal, and generating a second modulation signal on the basis of the comparison result; and a second controller, coupled to an output of the second comparison module, and generating a second control signal for at least one switch in the first switching circuit, the second control signal being based on the second modulation signal and a drive signal of at least one switch in the second switching circuit, wherein the second controller stops operating when the first controller is operating, and the first controller stops operating when the second controller is operating.

Preferably, the DC-DC converter further comprises a second driver, which is coupled to the second controller and drives at least one switch in the first switching circuit on the basis of the second control signal received from the second controller.

Preferably, the first switching circuit is a half bridge topology comprising a first switch and a second switch, and the second switching circuit is a half bridge topology comprising a third switch and a fourth switch, wherein the first switching circuit is coupled to said other side of the transformer, and the second switching circuit is coupled to said side of the transformer. The first controller is configured to: generate a first control signal which is used for one of the third switch and the fourth switch and based on the first modulation signal and a drive signal of the first switch, and generate a first control signal which is used for the other of the third switch and the fourth switch and based on the first modulation signal and a drive signal of the second switch. The second controller is configured to: generate a second control signal which is used for one of the first switch and the second switch and based on the second modulation signal and a drive signal of the third switch, and generate a second control signal which is used for the other of the first switch and the second switch and based on the second modulation signal and a drive signal of the fourth switch.

Preferably, the first switching circuit is a full bridge topology comprising a first switch, a second switch, a third switch and a fourth switch, and the second switching circuit is a full bridge topology comprising a fifth switch, a sixth switch, a seventh switch and an eighth switch, wherein the first switching circuit is coupled to said other side of the transformer, and the second switching circuit is coupled to said side of the transformer. The first controller is configured to: generate a first control signal which is used for one pair from the fifth and eighth switches and the sixth and seventh switches and based on the first modulation signal and a drive signal of the first switch or fourth switch, and generate a first control signal which is used for the other pair from the fifth and eighth switches and the sixth and seventh switches and based on the first modulation signal and a drive signal of the second switch or third switch. The second controller is configured to: generate a second control signal which is used for one pair from the first and fourth switches and the second and third switches and based on the second modulation signal and a drive signal of the fifth switch or eighth switch, and generate a second control signal which is used for the other pair from the first and fourth switches and the second and third switches and based on the second modulation signal and a drive signal of the sixth switch or seventh switch.

Preferably, the functions of the first current detection module and the second current detection module are realized by duplication of the same current detection module; and/or the functions of the first conversion module and the second conversion module are realized by duplication of the same conversion module; and/or the functions of the first comparison module and the second comparison module are realized by duplication of the same comparison module; and/or the functions of the first controller and the second controller are realized by duplication of the same controller; and/or the functions of the first driver and the second driver are realized by duplication of the same driver.

Preferably, the first comparison module outputs a HIGH pulse width modulation signal as the first modulation signal if the voltage signal received from the first conversion module is greater than the reference voltage signal, and outputs a LOW pulse width modulation signal as the first modulation signal if the voltage signal is less than the reference voltage signal. The second comparison module outputs a HIGH pulse width modulation signal as the second modulation signal if the voltage signal received from the second conversion module is greater than the reference voltage signal, and outputs a LOW pulse width modulation signal as the second modulation signal if the voltage signal is less than the reference voltage signal.

Preferably, the first controller outputs a HIGH first control signal if the first modulation signal and a drive signal of at least one switch in the first switching circuit are both HIGH, and outputs a LOW first control signal if one of the first modulation signal and a drive signal of at least one switch in the first switching circuit is LOW. The second controller outputs a HIGH second control signal if the second modulation signal and a drive signal of at least one switch in the second switching circuit are both HIGH, and outputs a LOW second control signal if one of the second modulation signal and a drive signal of at least one switch in the second switching circuit is LOW.

According to another aspect of the present invention, a bidirectional DC-DC converter is provided, comprising: a transformer; a first switching circuit, coupled to the primary side of the transformer, and comprising at least two switches; a second switching circuit, coupled to the secondary side of the transformer, and comprising at least two switches; a first current detection module, coupled to the secondary side, and detecting a current at the secondary side; a second current detection module, coupled to the primary side, and detecting a current at the primary side; at least one conversion module, coupled to an output of at least one of the first current detection module and the second current detection module, and converting a signal of the current received from the first current detection module or the second current detection module to a voltage signal; at least one comparison module, coupled to an output of the conversion module, and comparing the voltage signal with a reference voltage signal, and generating a modulation signal on the basis of the comparison result; and at least one controller, coupled to an output of the comparison module, and generating a control signal which is used for at least one switch in the second switching circuit and based on the modulation signal and a drive signal of at least one switch in the first switching circuit, or generating a control signal which is used for at least one switch in the first switching circuit and based on the modulation signal and a drive signal of at least one switch in the second switching circuit.

According to another aspect of the present invention, a control method is provided, comprising: detecting a current at a first side of a transformer in a DC-DC converter; converting a signal of the detected current to a voltage signal; comparing the voltage signal with a reference voltage signal, and generating a modulation signal on the basis of the comparison result; generating a control signal for at least one switch in a switching circuit coupled to the first side of the transformer, the control signal being based on the modulation signal and a drive signal of at least one switch in a switching circuit coupled to a second side of the transformer; and controlling the switching of at least one switch in the switching circuit at the first side on or off according to the control signal.

Preferably, the control method further comprises: detecting a current at the second side of the transformer in the DC-DC converter; converting a signal of the detected second-side current to another voltage signal; comparing the other voltage signal with another preset reference voltage signal, and generating another modulation signal on the basis of the comparison result; generating another control signal for at least one switch in the switching circuit coupled to the second side of the transformer, the other control signal being based on the other modulation signal and a drive signal of at least one switch in the switching circuit coupled to the first side of the transformer; and controlling the switching of at least one switch in the switching circuit at the second side on or off according to the other control signal.

As stated above, parasitic inductance and transformer leakage inductance in a DC-DC converter topology will resonate with the MOSFET junction capacitance, and this resonance energy causes the $V_{DS}$ signal to repeatedly cross zero. Conversely, the effect of the resonance energy on the $I_{DS}$ signal can be neglected. Thus, the solution of the present invention makes it possible to effectively avoid the phenomenon of repeated switching off and on caused by the $V_{DS}$ signal repeatedly crossing zero, and the performance of the DC-DC converter is thereby improved.

These and other advantages of the present invention will become more obvious through the following detailed description of preferred embodiments of the present invention in conjunction with the drawings.

BRIEF DESCRIPTION OF THE DRAWINGS

In order to further expound the above and other advantages and features of the content of the present disclosure, particular embodiments of the content of the present disclosure are explained in further detail below in conjunction with the drawings. The drawings together with the detailed explanation below are included in this specification and form a part thereof. Elements with identical functions and structures are indicated with identical reference labels. It should be understood that these drawings merely describe typical examples of the content of the present disclosure, and should not be regarded as limiting the scope thereof. In the drawings.

DETAILED DESCRIPTION

Demonstrative embodiments of the present disclosure are described below in conjunction with the drawings. For clarity and conciseness, not all of the features of actual embodiments are described herein. However, it should be understood that many decisions specific to embodiments must be made in the process of developing any such actual embodiments, in order to achieve specific objectives of the developers, for example to meet those limiting conditions that are relevant to the system and business, and these limiting conditions might be different for different embodiments. In addition, it should also be understood that although development work might be very complex and time-consuming, such development work is merely a routine task for persons skilled in the art who benefit from the content of the present disclosure.

It must also be explained here that in order to avoid confusing the present disclosure with unnecessary details, the drawings only show device structures and/or processing steps that are closely related to the solution according to the present disclosure, and omit other details that are not very pertinent to the present disclosure.

A DC-DC converter 200 according to an embodiment of the present invention is described below in conjunction with FIG. 4.

Figure 1:
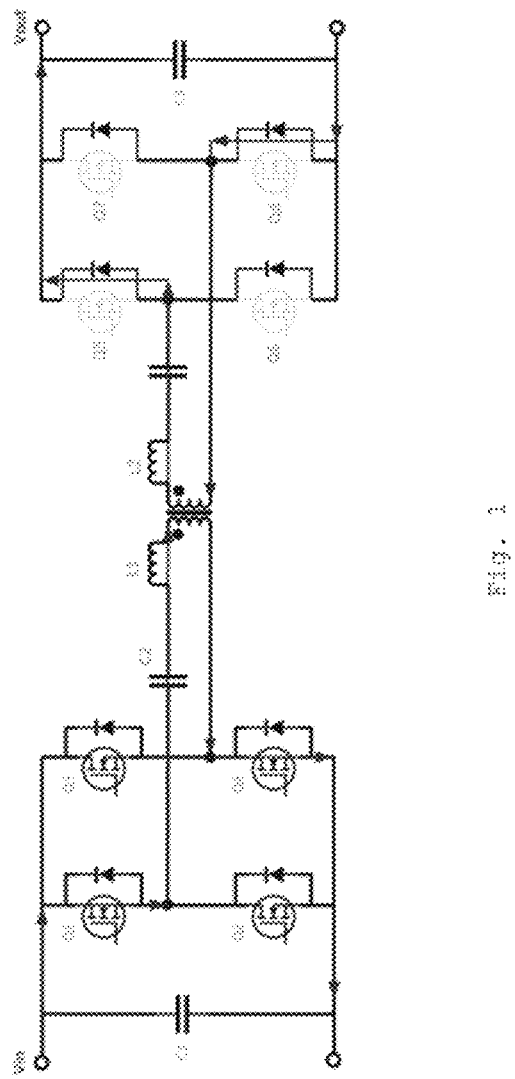
FIG. 1 shows a circuit diagram of a CLLC using diodes.
Figure 2:
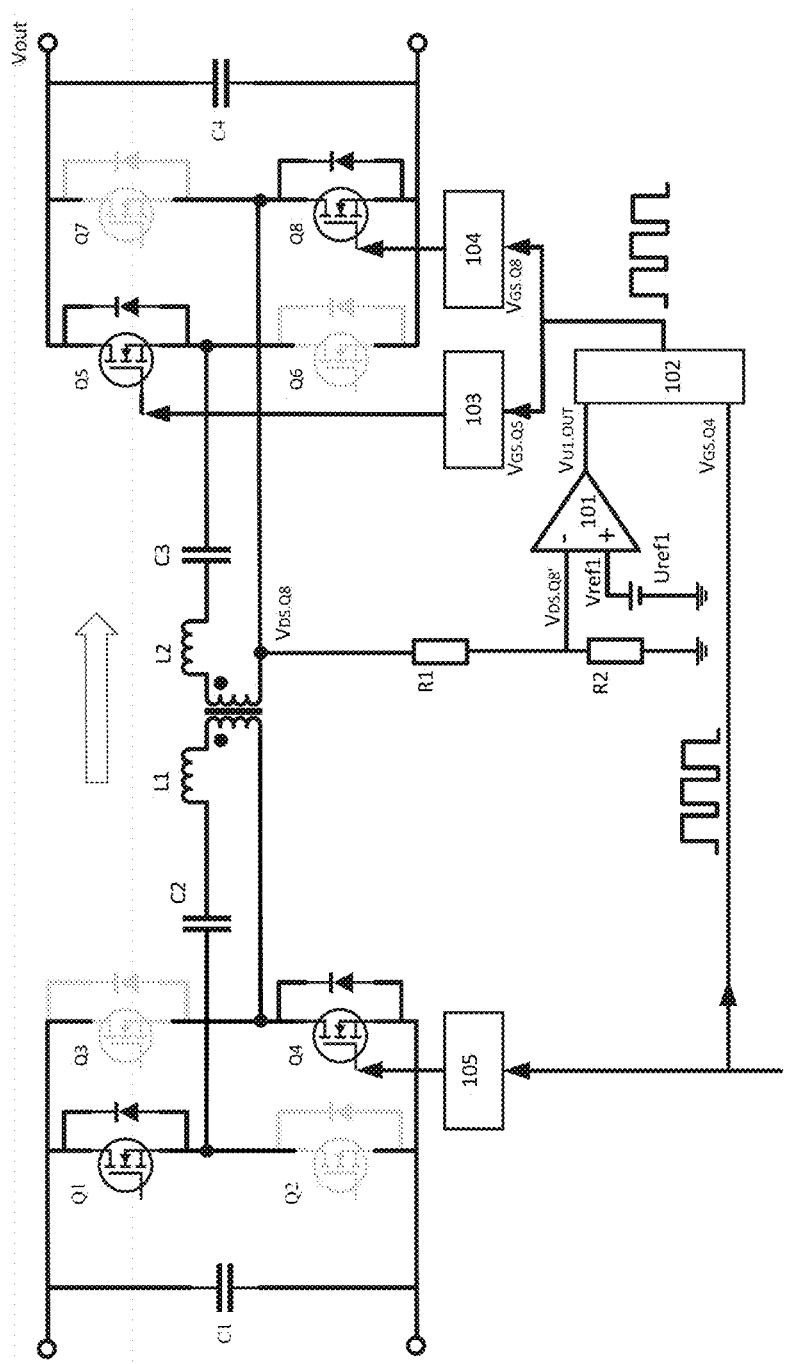
FIG. 2 shows a circuit diagram of a synchronous rectification solution.
Figure 3:
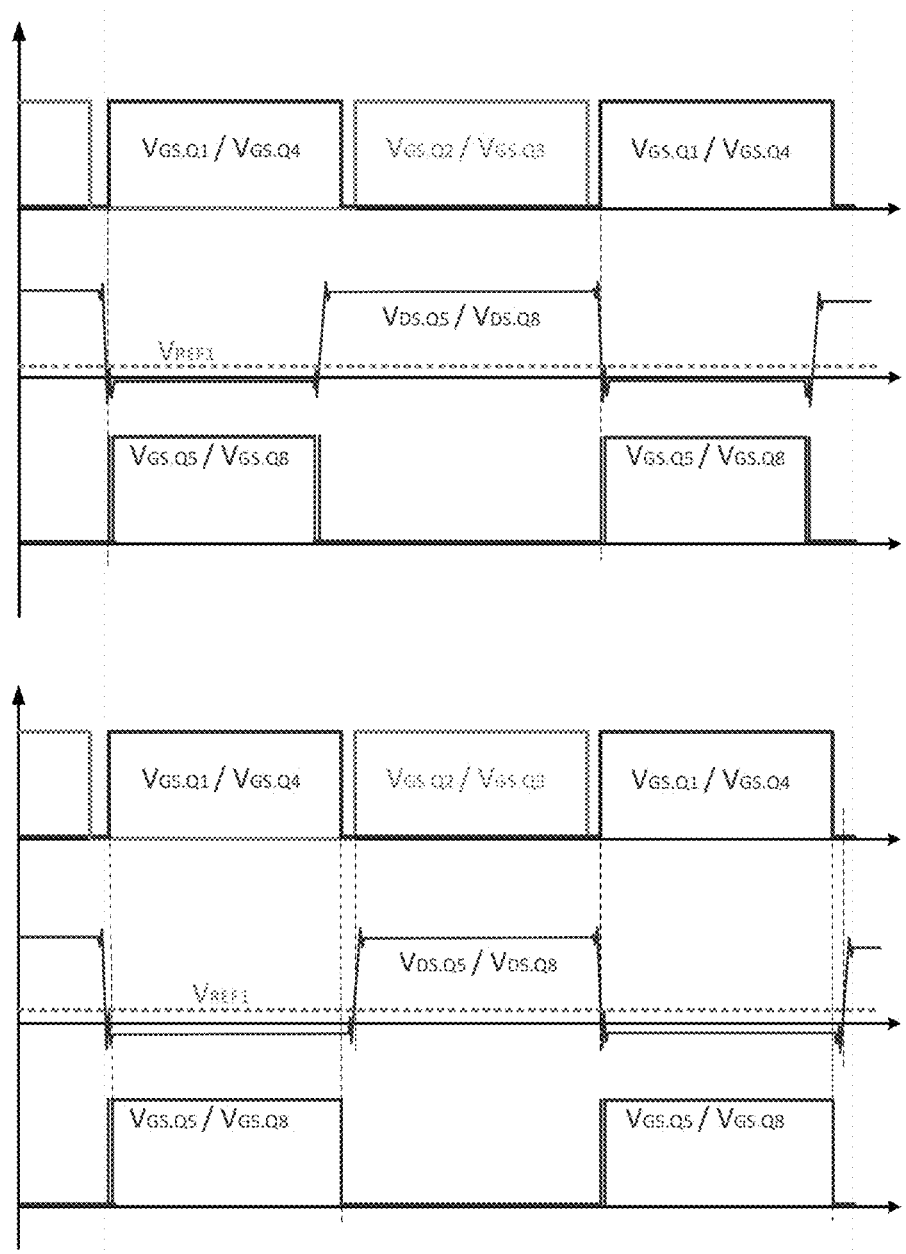
FIG. 3 shows synchronous rectification waveforms in the circuit shown in FIG. 2.
Figure 4:
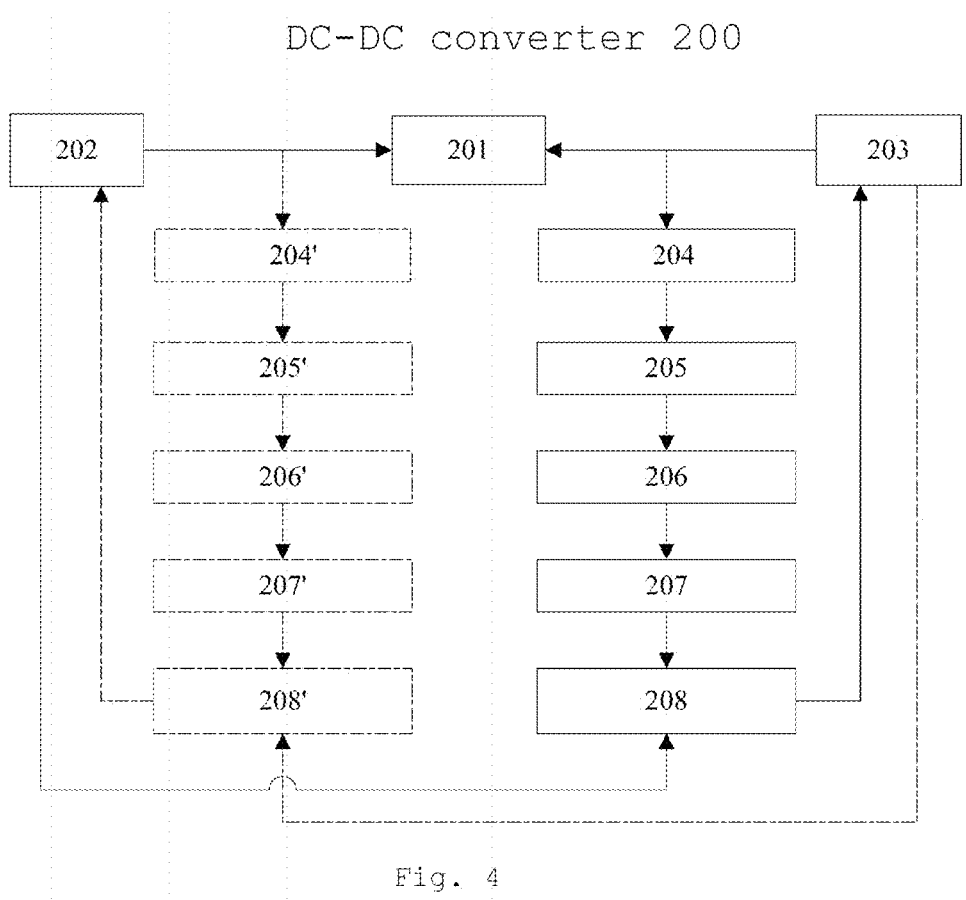
FIG. 4 shows schematically a block diagram of a DC-DC converter according to an embodiment of the present invention.

As shown in FIG. 4, the DC-DC converter 200 comprises a transformer 201, a first switching circuit 202, a second switching circuit 203, a current detection module 204, a conversion module 205, a comparison module 206, a controller 207 and a driver 208.

In this embodiment, the first switching circuit 202 and second switching circuit 203 are coupled to the primary side and secondary side of the transformer 201 respectively, and each comprise at least two switches. The current detection module 204 is coupled to the secondary side of the transformer 201 and detects a secondary-side current. The conversion module 205 converts a current signal received from the current detection module 204 to a voltage signal. The comparison module 206 compares the voltage signal received from the conversion module 205 with a reference voltage signal, and generates a modulation signal such as a PWM modulation signal on the basis of the comparison result. The controller 207 generates a control signal for at least one switch in the second switching circuit 203, the control signal being based on the modulation signal and a drive signal of at least one switch in the first switching circuit 202. The driver 208 drives at least one switch in the second switching circuit 203 on the basis of the control signal received from the controller 207.

According to another embodiment, the DC-DC converter 200 is bidirectional, and further comprises a current detection module 204', a conversion module 205', a comparison module 206', a controller 207' and a driver 208'. The way in which these are connected, and the functions thereof, are substantially the same as for the current detection module 204, conversion module 205, comparison module 206, controller 207 and driver 208, and are not described again superfluously here.

It should be understood that the current detection modules 204 and 204' can use the same current detection module, the conversion modules 205 and 205' can use the same conversion module, the comparison modules 206 and 206' can use the same comparator, the controllers 207 and 207' can use the same controller, and the drivers 208 and 208' can use the same driver.

Figure 5A:
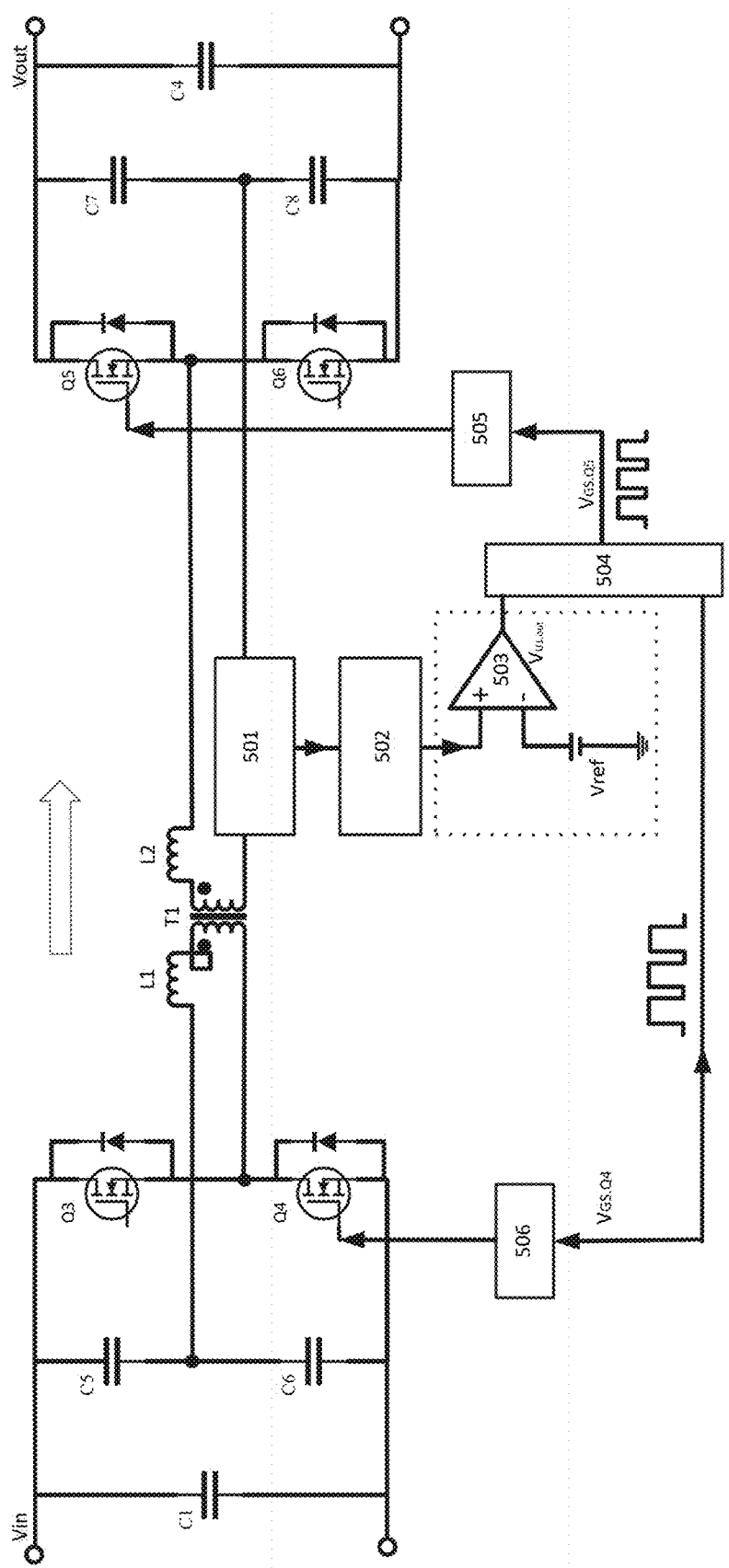
FIGS. 5A and 5B show circuit diagrams of forward and reverse DC-DC converters respectively according to a first embodiment of the present invention.
Figure 5B:
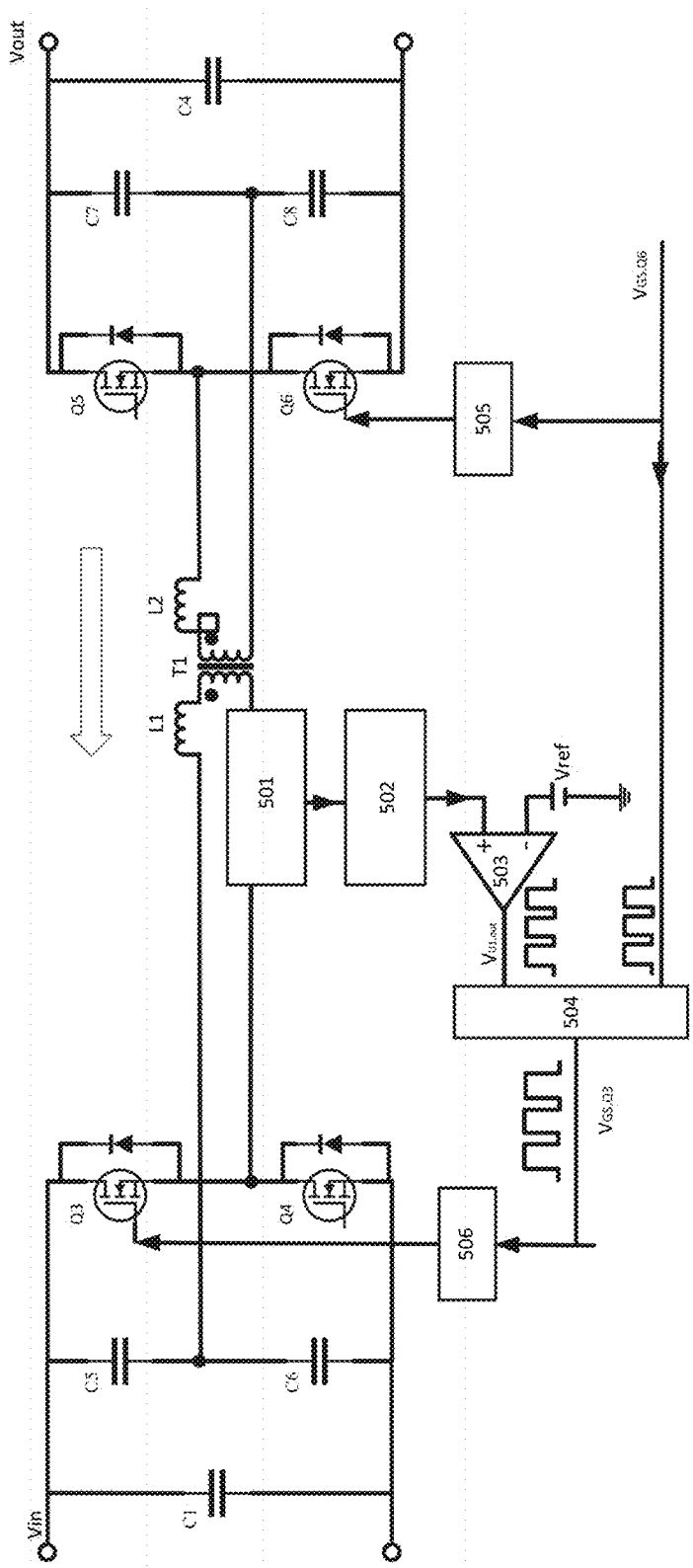

FIGS. 5A and 5B show circuit diagrams of forward and reverse DC-DC converters respectively according to a first embodiment of the present invention.

FIG. 5A shows a circuit structure for forward DC-DC conversion. As shown in FIG. 5A, the primary side of a transformer T1 is coupled to transistors Q3 and Q4 in a half bridge topology, and the secondary side is coupled to transistors Q5 and Q6 in a half bridge topology. A current detection module 501 is coupled to the secondary side of the transformer T1, and provides a detected secondary-side current to a current-to-voltage signal conversion module 502. The conversion module 502 outputs the converted voltage signal to a comparator 503. The comparator 503 compares the voltage signal with a reference signal Vref, and outputs a HIGH modulation signal $V_{U1.out}$ if the voltage signal is greater than the reference signal and outputs a LOW modulation signal $V_{U1.out}$ if the voltage signal is less than the reference signal. In this embodiment, the modulation signal $V_{U1.out}$ can for example be a PWM signal. It should be understood that the modulation signal $V_{U1.out}$ is not limited to being a PWM signal, and can also be any other suitable signal. An AND gate 504 performs an "AND" logic operation on the modulation signal $V_{U1.out}$ and a control signal $V_{GS.Q4}$ for a driver 506. That is to say, when the modulation signal $V_{U1.out}$ and the control signal $V_{GS.Q4}$ are both HIGH, a HIGH control signal $V_{GS.Q5}$ is outputted, and when one or both of the modulation signal $V_{U1.out}$ and the control signal $V_{GS.Q4}$ is/are LOW, a LOW control signal $V_{GS.Q5}$ is outputted. A driver 505 then controls the switching of transistor Q5 on and off according to the control signal $V_{GS.Q5}$ received from the AND gate 504.

It should be understood that in FIG. 5A, the AND gate 504 can also perform an "AND" logic operation on a control signal received from a driver for transistor Q3 and the modulation signal from the comparator 503. A driver for transistor Q6 then controls the switching of transistor Q6 on and off according to the control signal received from the AND gate 504.

It should also be understood that the control signal which the AND gate uses to perform the "AND" logic operation with the modulation signal from the comparator comes from another controller (not shown in the figure). In this embodiment, the control signal $V_{GS.Q4}$ is provided by another controller.

FIG. 5B shows a circuit structure which is symmetric with FIG. 5A and used for reverse DC-DC conversion. Conversely to FIG. 5A, the current detection module 501 in FIG. 5B is coupled to the primary side of the transformer T1, and provides a detected primary-side current to the current-to-voltage signal conversion module 502. The AND gate 504 performs an "AND" logic operation on the modulation signal $V_{U1.out}$ received from the comparator 503 and a control signal $V_{GS.Q6}$ for the driver 505. The driver 506 then controls the switching of transistor Q3 on and off according to a control signal $V_{GS.Q3}$ received from the AND gate 504.

It should be understood that in FIG. 5B, the AND gate 504 can also perform an "AND" logic operation on a control signal received from a driver for transistor Q5 and the modulation signal from the comparator 503. A driver for transistor Q4 then controls the switching of transistor Q4 on and off according to the control signal received from the AND gate 504.

It should also be understood that a bidirectional DC-DC converter can be realized by combining the forward circuit of FIG. 5A with the reverse circuit of FIG. 5B.

It should be pointed out that the current detection module 501 can be realized using for example a current transformer, a Hall sensor or a dedicated current sampling chip, etc., and the conversion module 502 can be realized using for example a diode rectification bridge or a biasing circuit, etc. The AND gate 504 can also be realized using for example a logic control chip, an MCU, etc.

It should be understood that an inductor L1, capacitors C5 and C6 and parasitic magnetizing inductance of the transformer T1 form a resonant circuit at the primary side of the transformer T1, whereas an inductor L2, capacitors C7 and C8 and parasitic magnetizing inductance of the transformer T1 form a resonant circuit at the secondary side of the transformer T1. It should also be understood that capacitors C1 and C4 are used for stabilizing an input voltage.

Figure 6A:
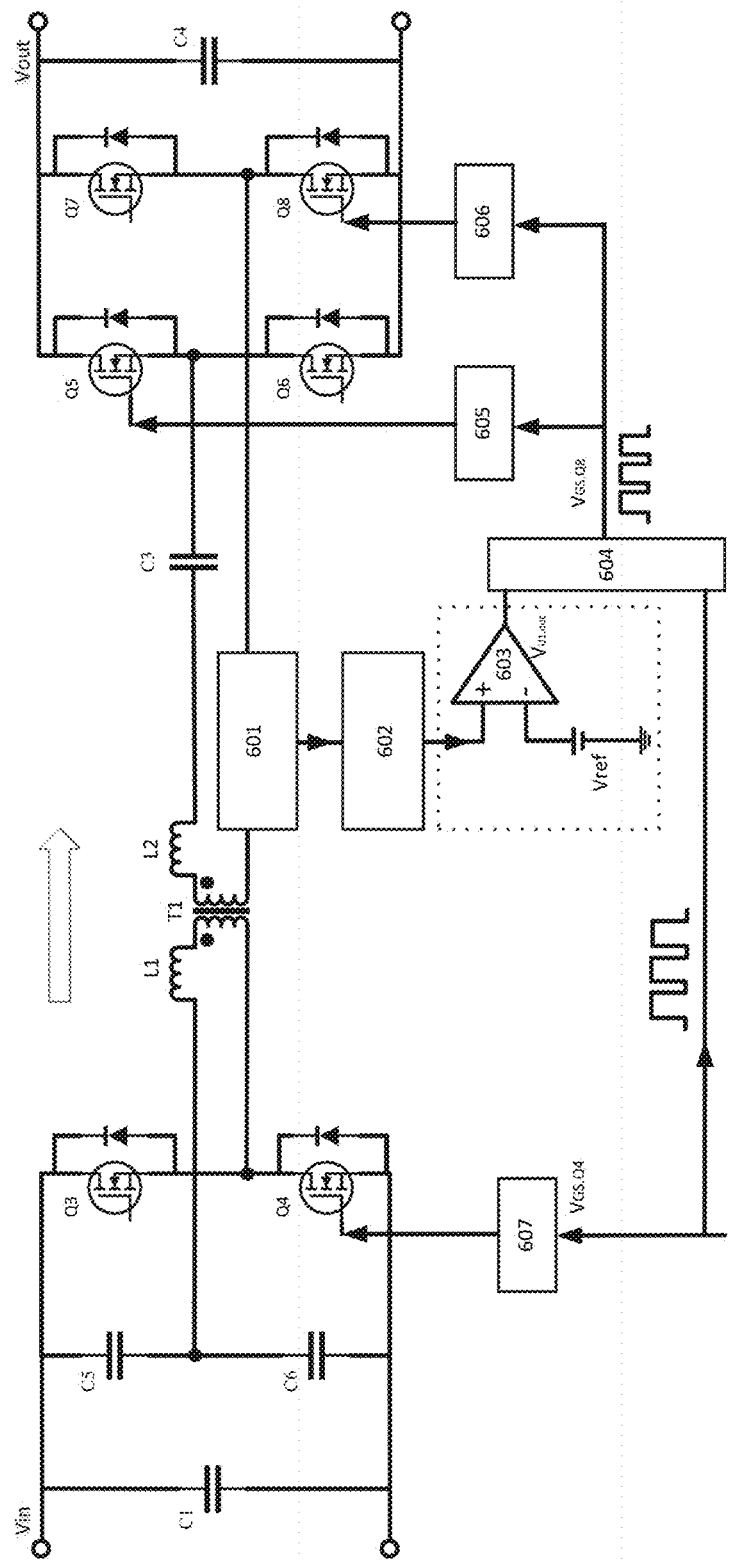
FIGS. 6A and 6B show circuit diagrams of forward and reverse DC-DC converters respectively according to a second embodiment of the present invention.
Figure 6B:
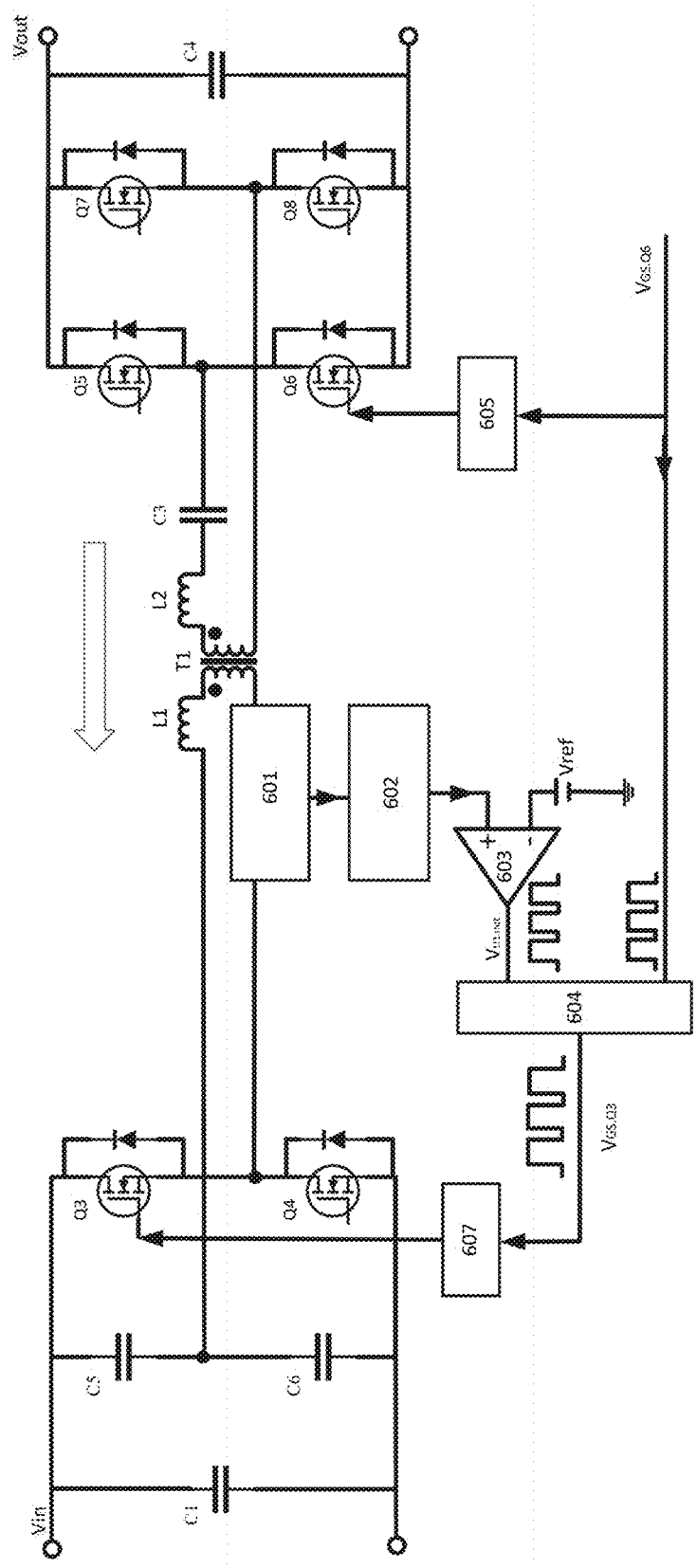

FIGS. 6A and 6B show circuit diagrams of forward and reverse DC-DC converters respectively according to a second embodiment of the present invention.

FIG. 6A shows a circuit structure for forward DC-DC conversion. FIG. 6A is similar to FIG. 5A; a current detection module 601 and a current-to-voltage signal conversion module 602 are coupled to the secondary side of the transformer T1. The difference is that in FIG. 6A, the secondary side of the transformer T1 is coupled to transistors Q5, Q6, Q7 and Q8 in a full bridge topology. In the circuit structure of FIG. 6A, an AND gate 604 performs an "AND" logic operation on a modulation signal $V_{U1.out}$ received from a comparator 603 and a control signal $V_{GS.Q4}$ for a driver 607. Drivers 605 and 606 then control the switching of transistors Q5 and Q8 on and off according to a control signal $V_{GS.Q8}$ received from the AND gate 604.

It should be understood that in FIG. 6A, the AND gate 604 can also perform an "AND" logic operation on a control signal for a driver (not shown) of transistor Q3 and the modulation signal from the comparator 603. Drivers (not shown) for transistors Q6 and Q7 then control the switching of transistors Q6 and Q7 on and off according to a control signal received from the AND gate 604.

FIG. 6B shows a circuit structure which is symmetric with FIG. 6A and used for reverse DC-DC conversion. In FIG. 6B, the AND gate 604 performs an "AND" logic operation on the modulation signal $V_{U1.out}$ received from the comparator 603 and a control signal $V_{GS.Q6}$ for the driver 605. The driver 607 then controls the switching of transistor Q3 on and off according to a control signal $V_{GS.Q3}$ received from the AND gate 604.

It should be understood that in FIG. 6B, the AND gate 604 can also perform an "AND" logic operation on a control signal for a driver of transistor Q7 and the modulation signal from the comparator 603, and the driver 607 then controls the switching of transistor Q3 on and off according to the control signal $V_{GS.Q3}$ received from the AND gate 604. Similarly, the AND gate 604 can also perform an "AND" logic operation on a control signal for a driver (not shown) of transistor Q5 or Q8 and the modulation signal from the comparator 603, and a driver (not shown) for transistor Q4 then controls the switching of transistor Q4 on and off according to a control signal received from the AND gate 604.

It should also be understood that a bidirectional DC-DC converter can be realized by combining the forward circuit of FIG. 6A with the reverse circuit of FIG. 6B.

Figure 7A:
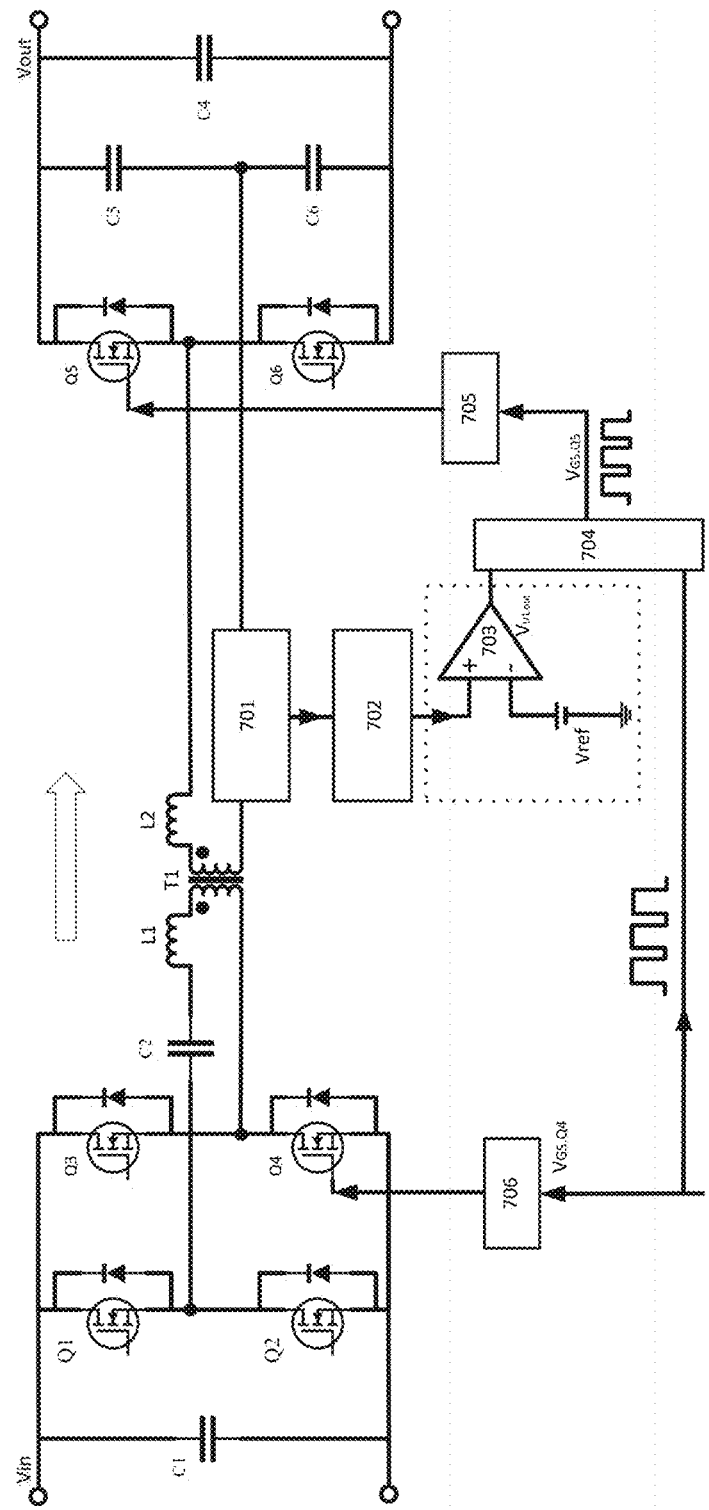
FIGS. 7A and 7B show circuit diagrams of forward and reverse DC-DC converters respectively according to a third embodiment of the present invention.
Figure 7B:
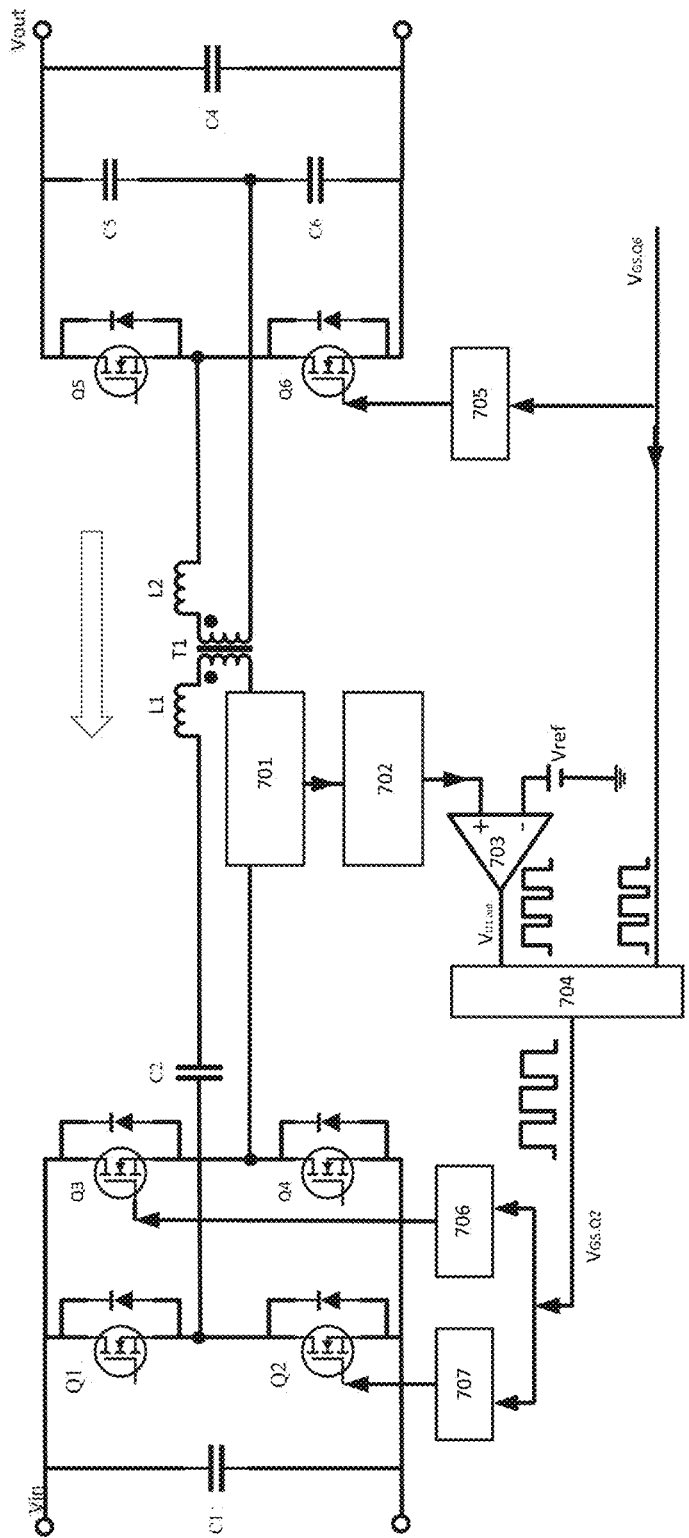

FIGS. 7A and 7B show circuit diagrams of forward and reverse DC-DC converters respectively according to a third embodiment of the present invention.

FIG. 7A shows a circuit structure for forward DC-DC conversion. FIG. 7A is similar to FIG. 5A; a current detection module 701 and a current-to-voltage signal conversion module 702 are coupled to the secondary side of the transformer T1. The difference is that in FIG. 7A, the primary side of the transformer T1 is coupled to transistors Q1, Q2, Q3 and Q4 in a full bridge topology. In the circuit structure of FIG. 7A, an AND gate 704 performs an "AND" logic operation on a modulation signal $V_{U1.out}$ received from a comparator 703 and a control signal $V_{GS.Q4}$ for a driver 706. A driver 705 then controls the switching of transistor Q5 on and off according to a control signal $V_{GS.Q5}$ from the AND gate 704.

It should be understood that in FIG. 7A, the AND gate 704 can also perform an "AND" logic operation on the modulation signal $V_{U1.out}$ received from the comparator 703 and a control signal $V_{GS.Q1}$ for a driver of transistor Q1, and the driver 705 then controls the switching of transistor Q5 on and off according to a control signal received from the AND gate 704. Similarly, the AND gate 704 can also perform an "AND" logic operation on the modulation signal received from the comparator 703 and a control signal for a driver (not shown) of transistor Q2 or Q3, and a driver (not shown) for transistor Q6 then controls the switching of transistor Q6 on and off according to a control signal received from the AND gate 704.

FIG. 7B shows a circuit structure which is symmetric with FIG. 7A and used for reverse DC-DC conversion. In FIG. 7B, the AND gate 704 performs an "AND" logic operation on the modulation signal $V_{U1.out}$ received from the comparator 703 and a control signal $V_{GS.Q6}$ for the driver 705. Drivers 706 and 707 then control the switching of transistors Q2 and Q3 on and off according to a control signal $V_{GS.Q2}$ received from the AND gate 704.

It should be understood that in FIG. 7B, the AND gate 704 can also perform an "AND" logic operation on the modulation signal received from the comparator 703 and a control signal for a driver (not shown) of transistor Q5. Drivers (not shown) for transistors Q1 and Q4 then control the switching of transistors Q1 and Q4 on and off according to a control signal received from the AND gate 704.

It should also be understood that a bidirectional DC-DC converter can be realized by combining the forward circuit of FIG. 7A with the reverse circuit of FIG. 7B.

Figure 8A:
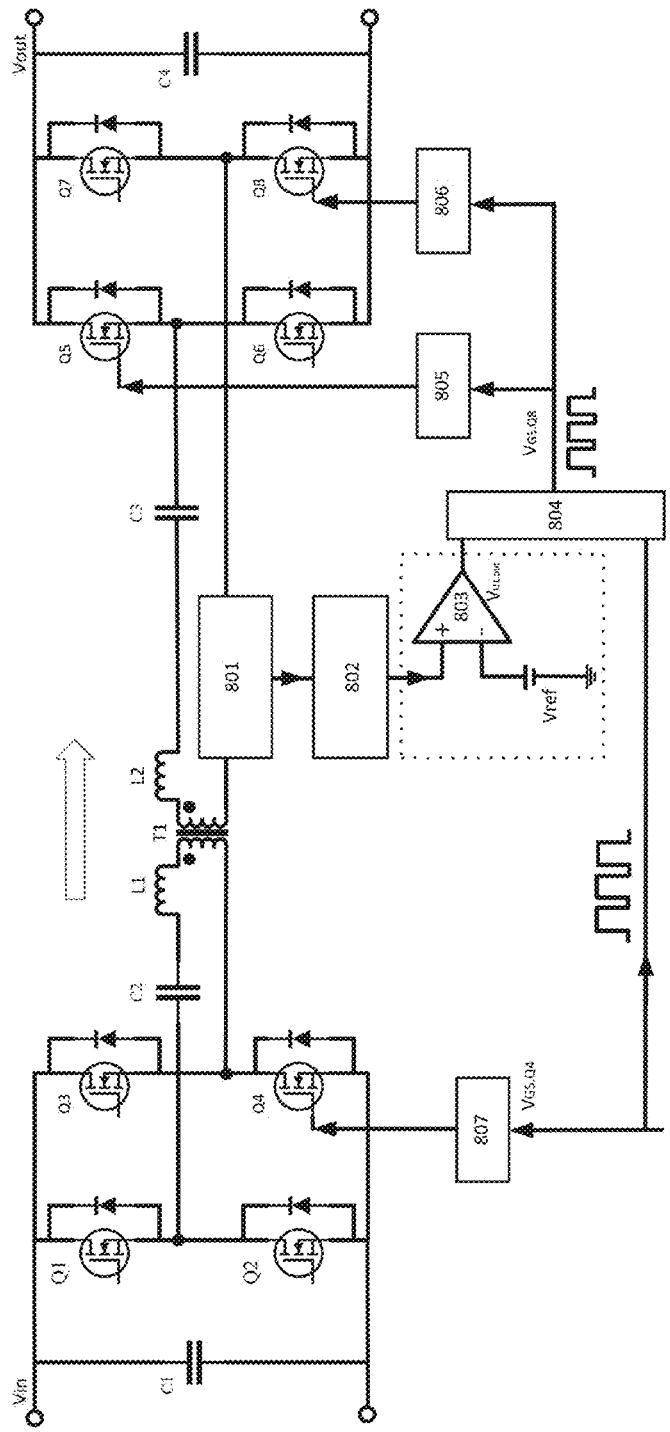
FIGS. 8A and 8B show circuit diagrams of forward and reverse DC-DC converters respectively according to a fourth embodiment of the present invention.
Figure 8B:
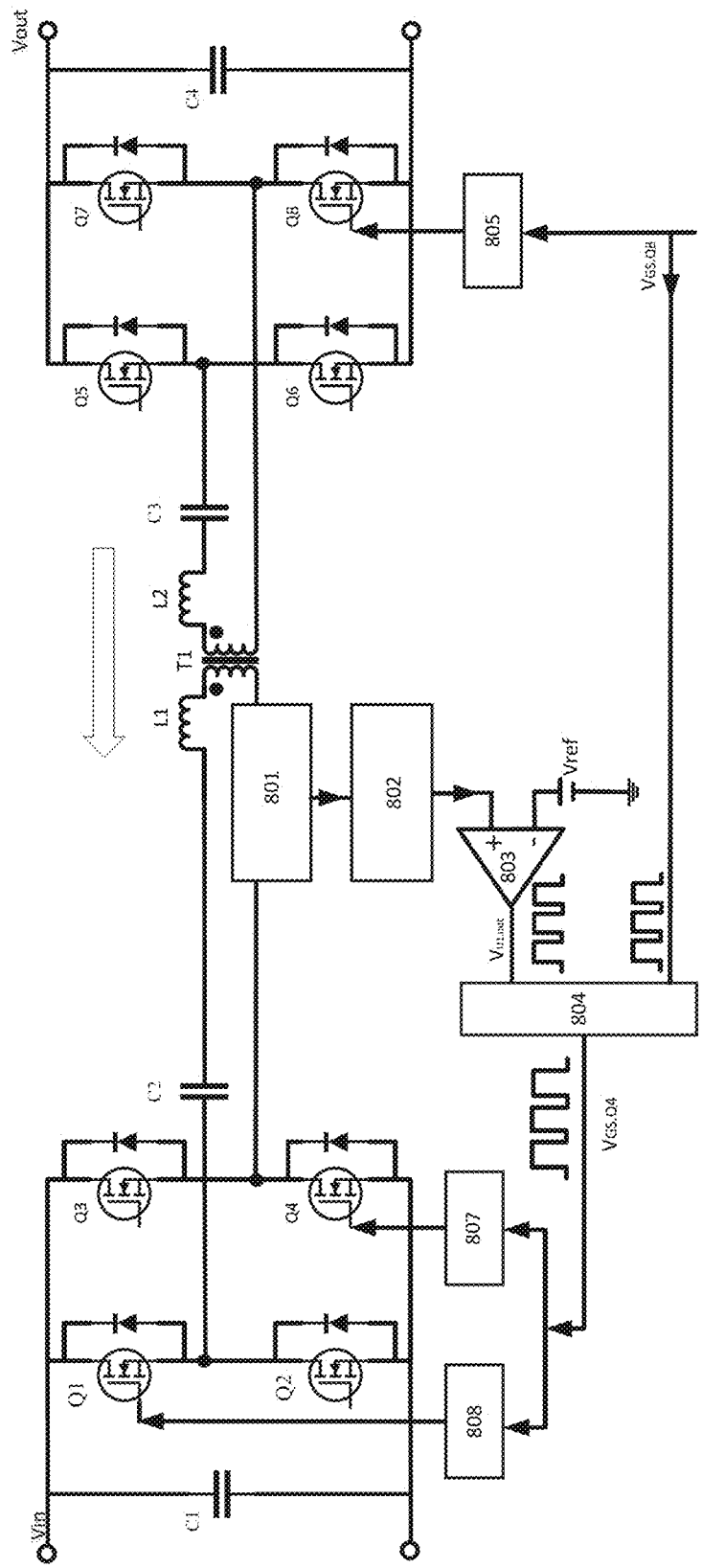

FIGS. 8A and 8B show circuit diagrams of forward and reverse DC-DC converters respectively according to a fourth embodiment of the present invention.

FIG. 8A shows a circuit structure for forward DC-DC conversion. FIG. 8A is similar to FIG. 5A; a current detection module 801 and a current-to-voltage signal conversion module 802 are coupled to the secondary side of the transformer T1. The difference is that in FIG. 8A, the primary side of the transformer T1 is coupled to transistors Q1, Q2, Q3 and Q4 in a full bridge topology, and the secondary side of the transformer is coupled to transistors Q5, Q6, Q7 and Q8 in a full bridge topology. In the circuit structure of FIG. 8A, an AND gate 804 performs an "AND" logic operation on a modulation signal $V_{U1.out}$ received from a comparator 803 and a control signal $V_{GS.Q4}$ for a driver 807. Drivers 805 and 806 then control the switching of transistors Q5 and Q8 on and off according to a control signal $V_{GS.Q8}$ from the AND gate 804.

It should be understood that in FIG. 8A, the AND gate 804 can also perform an "AND" logic operation on the modulation signal received from the comparator 803 and a control signal for a driver (not shown) of transistor Q1. The drivers 805 and 806 then control the switching of transistors Q5 and Q8 on and off according to a control signal from the AND gate 804. Similarly, the AND gate 804 can also perform an "AND" logic operation on the modulation signal received from the comparator 803 and a control signal for a driver (not shown) of transistor Q2 or Q3. Drivers (not shown) for transistors Q6 and Q7 then control the switching of transistors Q6 and Q7 on and off according to a control signal from the AND gate 804.

FIG. 8B shows a circuit structure which is symmetric with FIG. 8A and used for reverse DC-DC conversion. In FIG. 8B, the AND gate 804 performs an "AND" logic operation on the modulation signal $V_{U1.out}$ received from the comparator 803 and a control signal $V_{GS.Q8}$ for the driver 805. Drivers 807 and 808 then control the switching of transistors Q1 and Q4 on and off according to a control signal $V_{GS.Q4}$ received from the AND gate 804.

It should be understood that in FIG. 8B, the AND gate 804 can also perform an "AND" logic operation on the modulation signal received from the comparator 803 and a control signal for a driver (not shown) of transistor Q5. The drivers 807 and 808 then control the switching of transistors Q1 and Q4 on and off according to a control signal from the AND gate 804. Similarly, the AND gate 804 can also perform an "AND" logic operation on the modulation signal received from the comparator 803 and a control signal for a driver (not shown) of transistor Q6 or Q7. Drivers (not shown) for transistors Q2 and Q3 then control the switching of transistors Q2 and Q3 on and off according to a control signal from the AND gate 804.

It should also be understood that a bidirectional DC-DC converter can be realized by combining the forward circuit of FIG. 8A with the reverse circuit of FIG. 8B.

Figure 9:
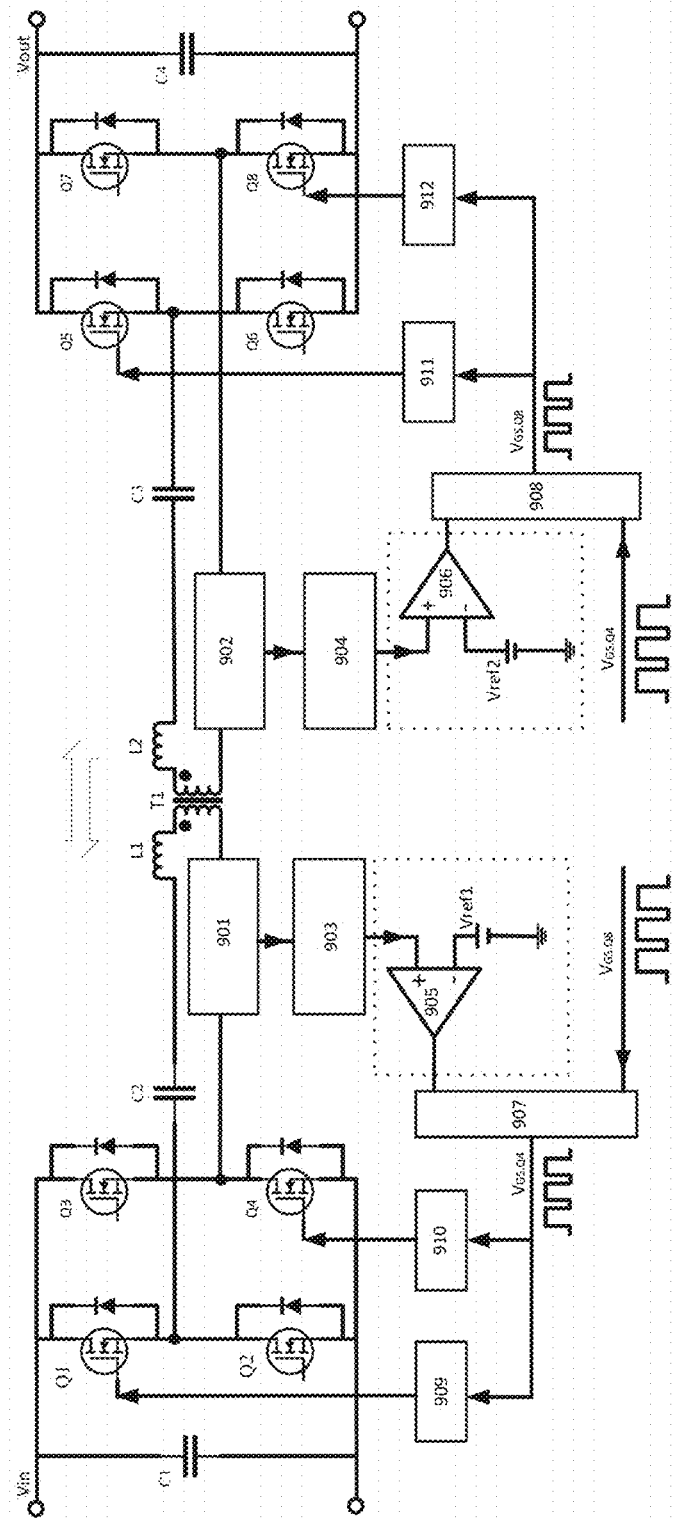
FIG. 9 shows a circuit diagram of a bidirectional DC-DC converter according to the fourth embodiment.

FIG. 9 shows such a bidirectional DC-DC converter. As shown in FIG. 9, the primary side and secondary side of the transformer T1 are respectively coupled to current detection modules 901 and 902, conversion modules 903 and 904, comparators 905 and 906, AND gates 907 and 908, and drivers 909, 910, 911 and 912. Although not shown in FIG. 9, it should be understood that transistors Q2, Q3, Q6 and Q7 are also connected to their respective drivers.

It should be understood that reference voltage signals Vref1 and Vref2 in FIG. 9 can have the same values, but can also have different values as required.

It should also be understood that the two switching circuits at the two sides of the transformer T1 in FIG. 9 can also be realized in such a way as to both be a half bridge topology, or such that one is a half bridge topology while the other is a full bridge topology.

Figure 10:
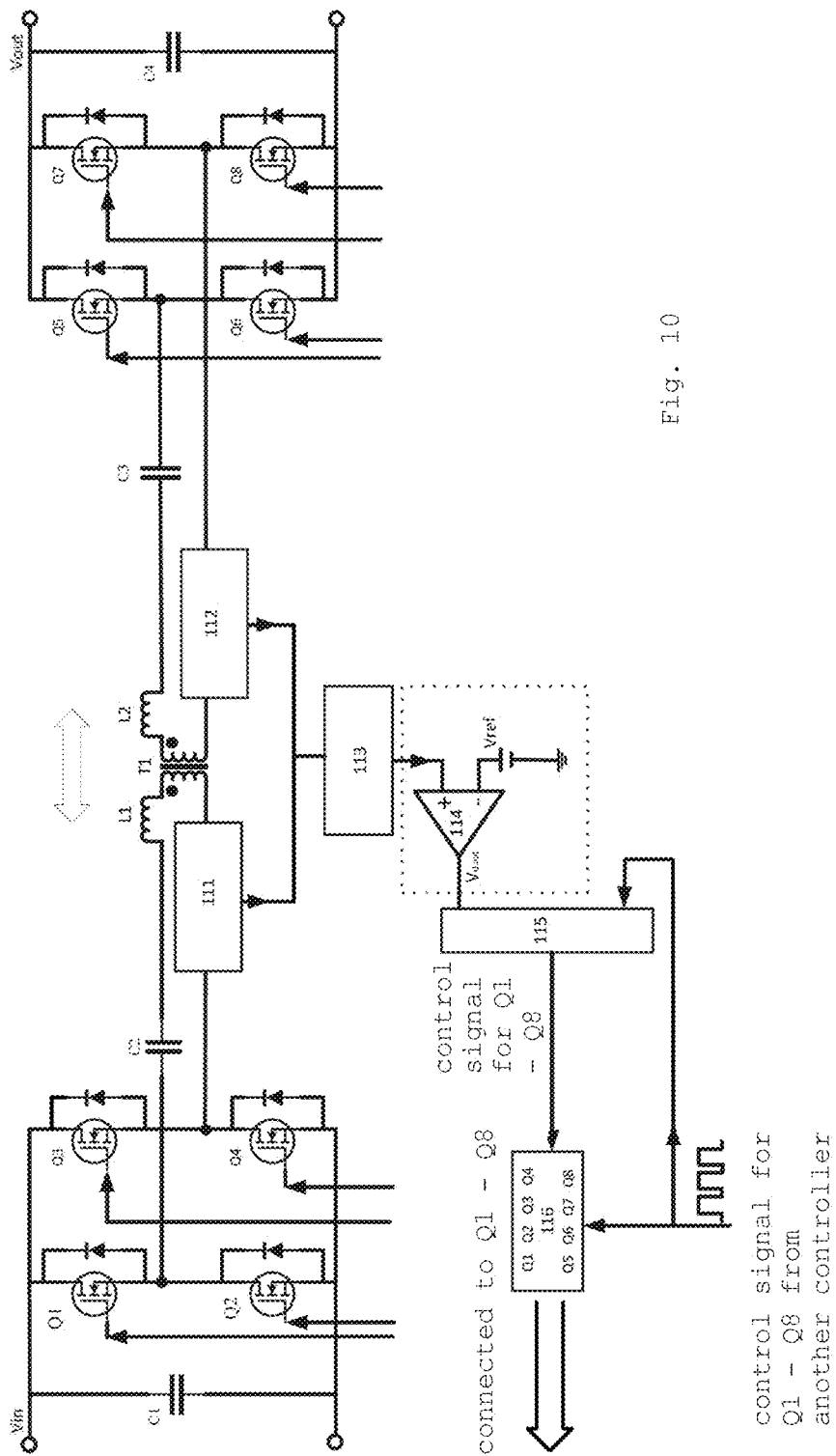
FIG. 10 shows a circuit diagram of a bidirectional DC-DC converter according to a fifth embodiment of the present invention.

FIG. 10 shows a circuit diagram of a bidirectional DC-DC converter according to a fifth embodiment of the present invention. As shown in FIG. 10, current detection modules 111 and 112 are coupled to the primary side and the secondary side of the transformer T1 respectively. Unlike the bidirectional DC-DC converter shown in FIG. 9, the bidirectional DC-DC converter shown in FIG. 10 comprises one conversion module 113, one comparator 114, one AND gate 115 and one driver 116, and the driver 116 can be controlled separately by the AND gate 115 and another controller (not shown in the figure), and separately provides corresponding drive signals to transistors Q1-Q8 coupled thereto.

As shown in FIG. 10, in the case of forward conversion, the conversion module 113 converts a current signal received from the current detection module 112 to a voltage signal. The comparator 114 compares the voltage signal with a reference signal and outputs a modulation signal $V_{U\_out}$. The AND gate 115 performs an "AND" logic operation on the modulation signal $V_{U\_out}$ received from the comparator 114 and a control signal from another controller (not shown in the figure), said control signal being used for one of transistors Q1-Q4, and outputs a control signal for a transistor pair in transistors Q5-Q8, said transistor pair corresponding to one of transistors Q1-Q4. The driver 116 then controls the switching of the corresponding transistors on and off according to the control signal received from the AND gate 115.

In the case of reverse conversion, the conversion module 113 converts a current signal received from the current detection module 111 to a voltage signal. The comparator 114 compares the voltage signal with a reference signal and outputs a modulation signal $V_{U\_out}$. The AND gate 115 performs an "AND" logic operation on the modulation signal $V_{U\_out}$ received from the comparator 114 and a control signal from another controller (not shown in the figure), said control signal being used for one of transistors Q5-Q8, and outputs a control signal for a transistor pair in transistors Q1-Q4, said transistor pair corresponding to one of transistors Q5-Q8. The driver 116 then controls the switching of the corresponding transistor pair on and off according to the control signal received from the AND gate 115.

Figure 11A:
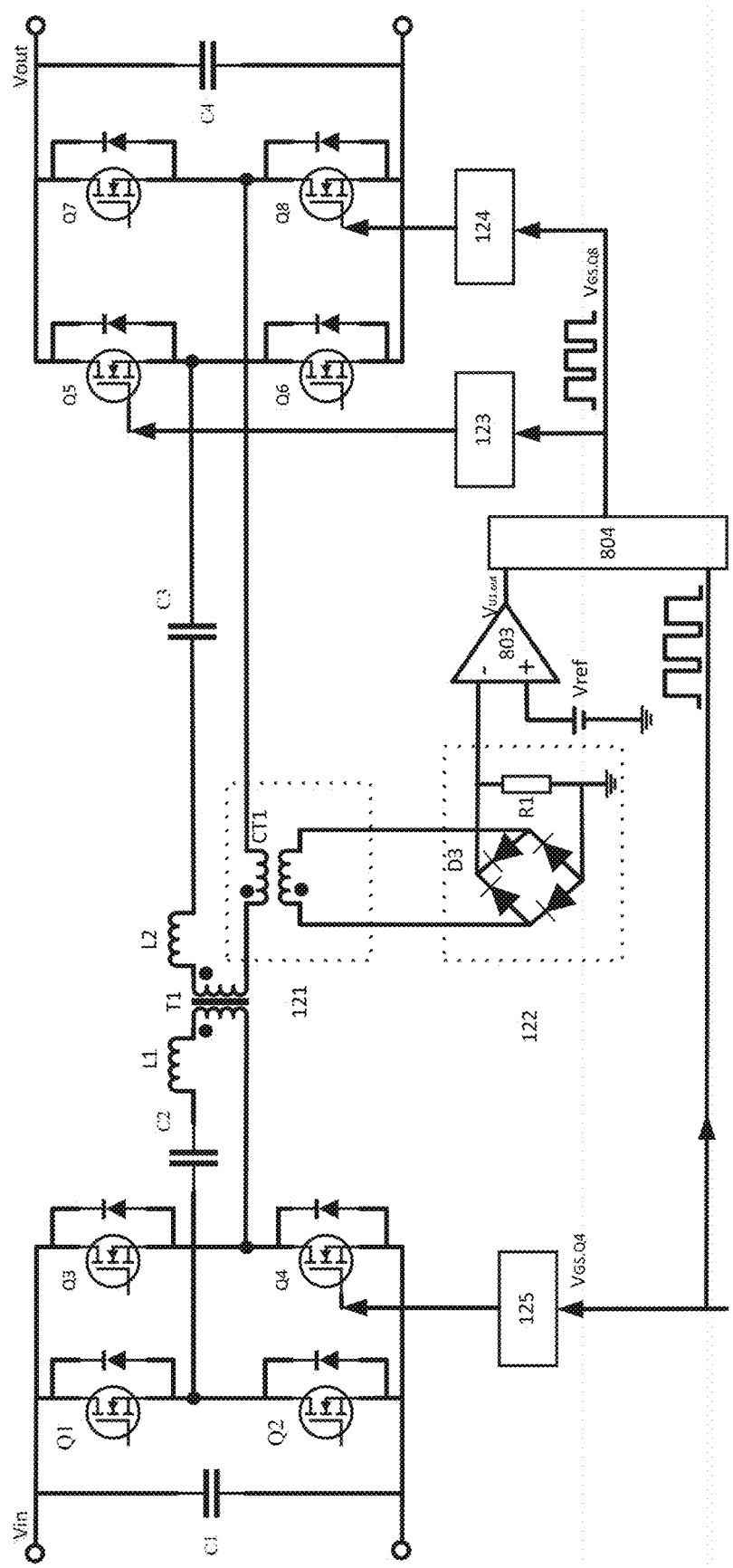
FIG. 11A shows a circuit diagram of a DC-DC converter according to another embodiment of the present invention.
Figure 11B:
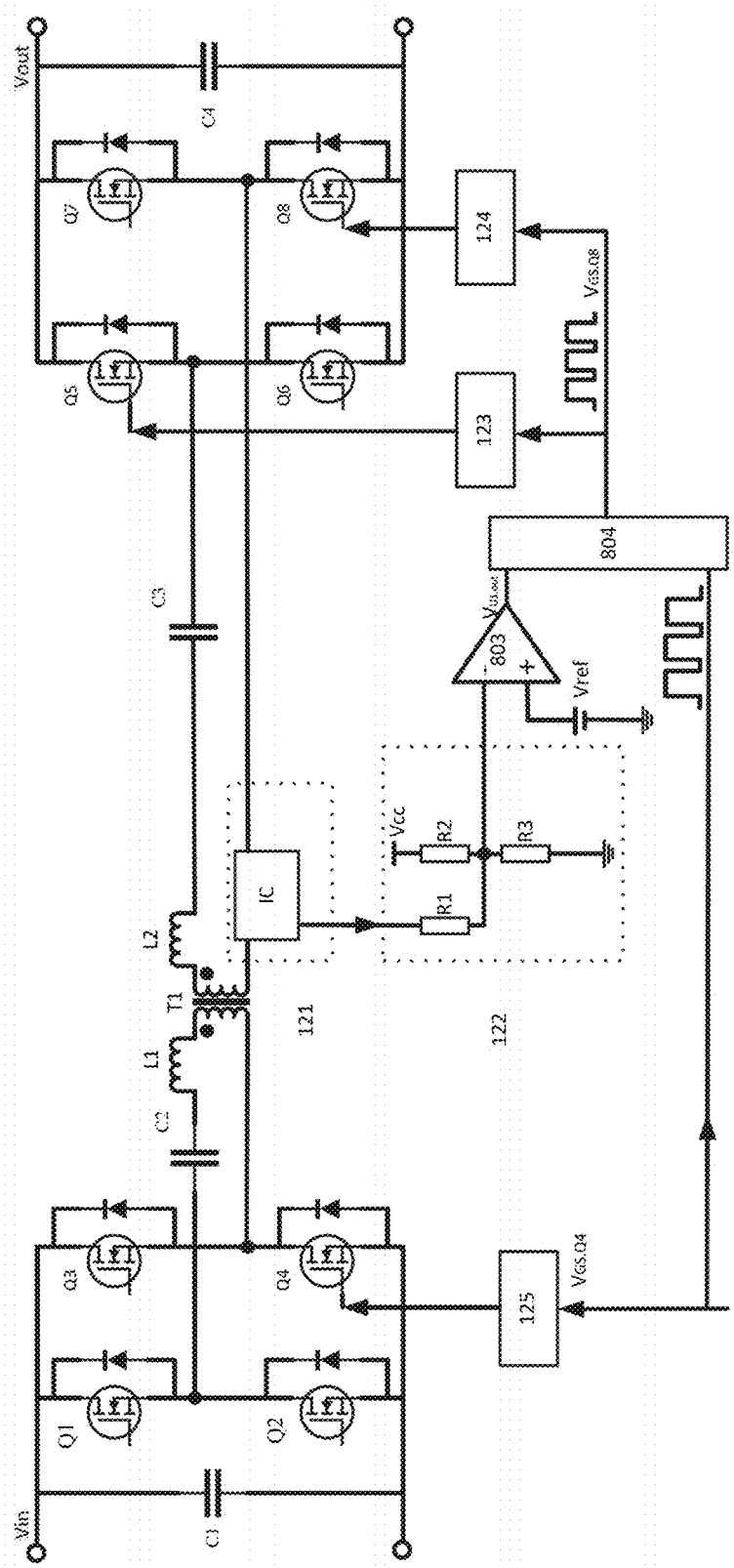
FIG. 11B shows a circuit diagram of a DC-DC converter according to another embodiment of the present invention.

As stated above, current detection can be realized by using for example a current transformer, a Hall sensor or a dedicated current sampling chip, etc., and current-to-voltage signal conversion can be realized by using for example a diode rectification bridge or a biasing circuit, etc. FIGS. 11A and 11B show DC-DC converters according to different embodiments. As shown in FIG. 11A, a current detection module 121 is realized by a current transformer CT1, and a current-to-voltage signal conversion module 122 is realized by a diode rectification bridge D3. As shown in FIG. 11B, the current detection module 121 is realized by a dedicated current sampling chip IC, and the current-to-voltage signal conversion module 122 is realized by a biasing circuit formed by resistors R1, R2 and R3. Furthermore, drivers 123, 124 and 125 in FIGS. 11A and 11B are the same as drivers 805, 806 and 807 in FIG. 8A, and are not described again here superfluously.

Figure 12:
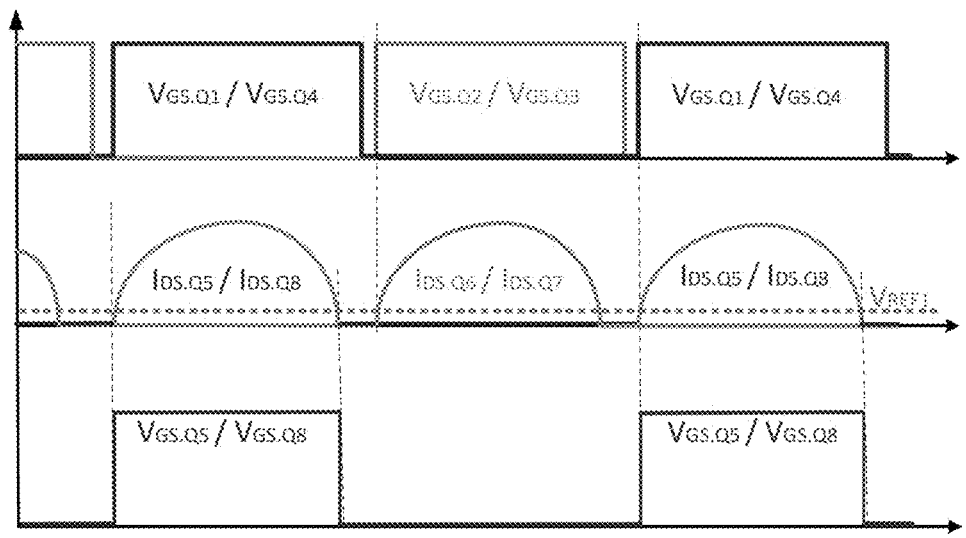
FIG. 12 shows synchronous rectification waveforms in one embodiment of the DC-DC converter circuit shown in FIG. 8A.
Figure 12:
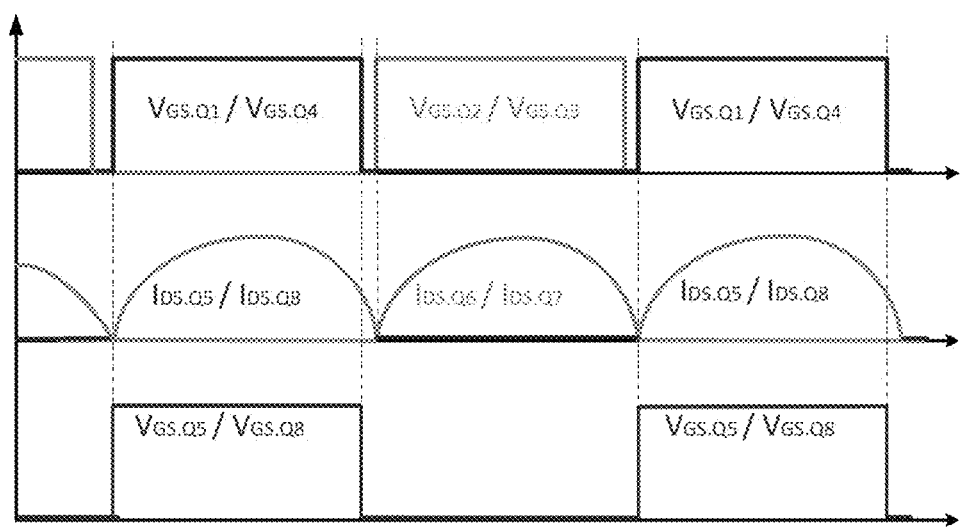

FIG. 12 shows synchronous rectification waveforms in one embodiment of the DC-DC converter circuit shown in FIG. 8A, wherein the upper graph is the synchronous rectification waveforms when a frequency fs of a PWM signal is less than an oscillation frequency frl of a resonant circuit formed by L1, C2 and parasitic magnetizing inductance of the transformer T1, and the lower graph is the synchronous rectification waveforms when the PWM signal frequency fs is greater than the oscillation frequency frl. As shown in FIG. 12, the switching of transistors Q5 and Q8 in FIG. 8A on or off (i.e. $V_{GS.Q5}/V_{GS.Q8}$ is HIGH or LOW) can be achieved by performing an "AND" logic operation on $V_{GS.Q1}$ or $V_{GS.Q4}$ and a voltage signal converted from $I_{DS.Q5}/I_{DS.Q8}$.

Figure 13:
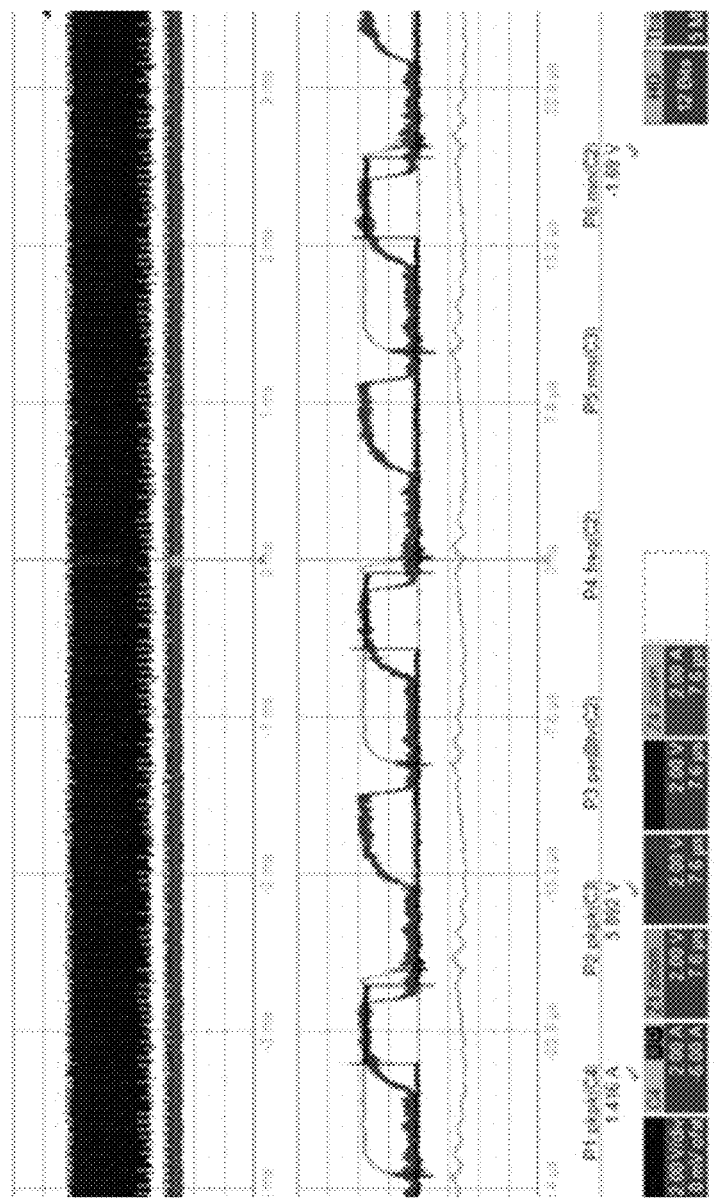
FIG. 13 is an oscilloscope screenshot of synchronous rectification waveforms in one embodiment of the DC-DC converter circuit shown in FIG. 8A.

FIG. 13 is an oscilloscope screenshot of synchronous rectification waveforms of outputs of the comparator 803 and transistors Q4 and Q8 in one embodiment of the DC-DC converter circuit shown in FIG. 8A. It can be seen from FIG. 13 that the switching waveform of transistor Q8 at the secondary side of the transformer T1 is essentially the same as the waveform of the output of the comparator 803, and at the same time is also synchronous with the switching of the primary-side transistor Q4. Thus, the DC-DC converter according to embodiments of the present invention effectively avoids the phenomenon of repeated switching off and on caused by the $V_{DS}$ signal of the MOSFET at the secondary side of the transformer repeatedly crossing zero, and the performance of the DC-DC converter is thereby improved.

It should be pointed out that although the transistor is shown as being a MOSFET in the drawings, the present invention is not limited to this, and can use any other type of transistor capable of performing the same function, for example but not limited to a field effect transistor (FET), junction field effect transistor (JFET), dual gate MOSFET, insulated gate bipolar transistor (IGBT), etc. Examples of MOSFETs can include but are not limited to P-type metal oxide semiconductors (PMOS), N-type metal oxide semiconductors (NMOS), double-diffused metal oxide semiconductors (DMOS) or any other type of MOSFET.

Figure 14:
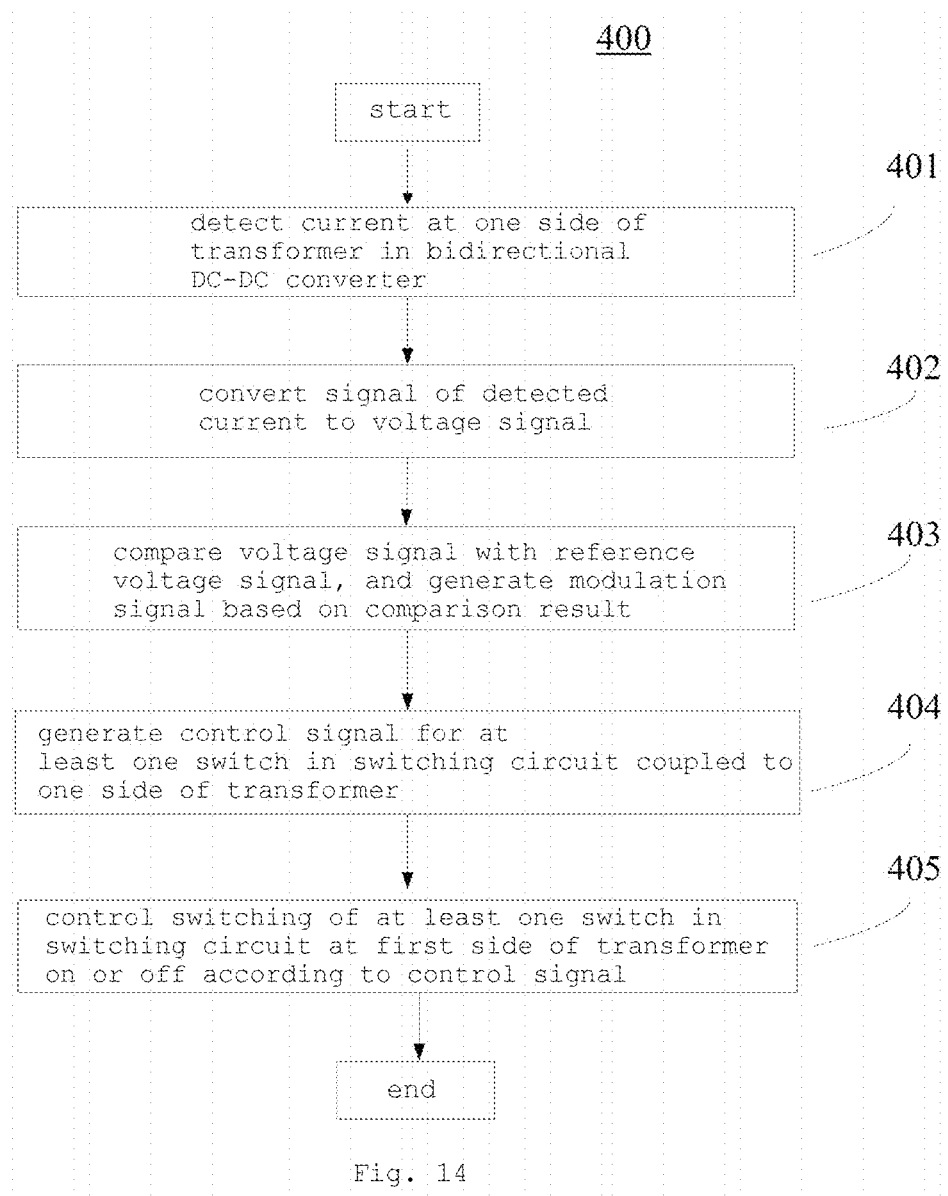
FIG. 14 is a flow chart of a control method according to an embodiment of the present invention.

FIG. 14 is a flow chart of a control method 400 according to an embodiment of the present invention. It should be pointed out that the method 400 of FIG. 14 can be realized using the bidirectional DC-DC converter according to an embodiment of the present invention. The control method 400 of FIG. 14 is described below in conjunction with the bidirectional DC-DC converter of FIG. 9.

First of all, in step 401, a current at one side of the transformer in the bidirectional DC-DC converter is detected. Specifically, the current detection module 901 in FIG. 9 can be used to detect a current at the primary side of the transformer T1, or the current detection module 902 in FIG. 9 can be used to detect a current at the secondary side of the transformer T1.

Next, in step 402, a signal of the detected current is converted to a voltage signal. Specifically, the conversion module 903 or 904 in FIG. 9 can be used to convert the signal of the current received from the current detection module 901 or 902 to a voltage signal.

Next, in step 403, the converted voltage signal is compared with a reference voltage signal, and a modulation signal is generated on the basis of the comparison result. Specifically, the comparator 905 or 906 in FIG. 9 can be used to compare the voltage signal received from the conversion module 903 or 904 with the reference voltage signal Vref1 or Vref2, and a HIGH PWM signal is generated if the voltage signal is greater than the reference signal, and a LOW PWM signal is generated if the voltage signal is less than the reference signal.

Next, in step 404, a control signal for at least one switch in the switching circuit coupled to one side of the transformer is generated. Specifically, the AND gate 907 or 908 in FIG. 9 can be used to perform an "AND" logic operation on the PWM signal and a control signal for a corresponding transistor in the secondary-side or primary-side switching circuit, and thereby generate a control signal for the corresponding switch in the switching circuit at the primary side or secondary side of the transformer T1.

Finally, in step 405, the switching of at least one switch in the switching circuit at one side of the transformer on or off is controlled according to the control signal. Specifically, the drivers 909, 910, 911 and 912 in FIG. 9 can be used to control the switching of transistor Q1, Q4, Q5 or Q8 on or off on the basis of the control signal received from the AND gate 907 or 908.

It should be pointed out that the term "comprise", "include" or any other variant thereof is intended to cover non-exclusive inclusion, such that a process, method, object or device comprising a series of key elements does not only comprise those key elements, but also comprises other key elements that are not explicitly listed, or also comprises key elements that are inherent to such a process, method, object or device. In addition, in the absence of further limitation, a key element defined by the phrase "comprises a . . . " does not rule out the presence of another identical key element in the process, method, object or device comprising the key element.

It should also be pointed out that in the embodiments described, any direct electrical connection or coupling between elements, i.e. a connection or coupling without an intermediate element, can be replaced by an indirect connection or coupling, i.e. a connection or coupling comprising one or more additional intermediate element, and vice versa, as long as the general aim of the connection or coupling, e.g. providing some kind of signal, some kind of information or some kind of control, is essentially preserved. In other words, as long as the general aim and function of a connection or coupling is essentially kept unchanged, the connection and coupling can be altered.

At least some embodiments are defined by the examples given below.

Example 1. A DC-DC converter, comprising:
a transformer;
a first switching circuit and a second switching circuit, each coupled to one of two sides of the transformer respectively, and each comprising at least two switches;
a first current detection module, coupled to one side of the transformer and detecting a current at said side;
a first conversion module, coupled to an output of the first current detection module, and converting a signal of the current received from the first current detection module to a voltage signal;
a first comparison module, coupled to an output of the first conversion module, and comparing the voltage signal received from the first conversion module with a reference voltage signal, and generating a first modulation signal on the basis of the comparison result; and
a first controller, coupled to an output of the first comparison module, and generating a first control signal for at least one switch in the second switching circuit, the first control signal being based on the first modulation signal and a drive signal of at least one switch in the first switching circuit.

Example 2. The DC-DC converter according to Example 1, further comprising a first driver, which is coupled to the first controller and drives at least one switch in the second switching circuit on the basis of the first control signal received from the first controller.

Example 3. The DC-DC converter according to Example 1 or 2, wherein the drive signal is generated on the basis of a control signal provided by another controller, in order to drive at least one switch in the first switching circuit.

Example 4. The DC-DC converter according to any one of Examples 1-3, further comprising a first resonant circuit and a second resonant circuit coupled to the two sides of the transformer respectively.

Example 5. The DC-DC converter according to any one of Examples 1-4, further comprising:
a second current detection module, coupled to the other side of the transformer and detecting a current at said other side;
a second conversion module, coupled to an output of the second current detection module, and converting a signal of the current received from the second current detection module to a voltage signal;
a second comparison module, coupled to an output of the second conversion module, and comparing the voltage signal received from the second conversion module with the reference voltage signal, and generating a second modulation signal on the basis of the comparison result; and
a second controller, coupled to an output of the second comparison module, and generating a second control signal for at least one switch in the first switching circuit, the second control signal being based on the second modulation signal and a drive signal of at least one switch in the second switching circuit,
wherein the second controller stops operating when the first controller is operating, and the first controller stops operating when the second controller is operating.

Example 6. The DC-DC converter according to any one of Examples 1-5, further comprising a second driver, which is coupled to the second controller and drives at least one switch in the first switching circuit on the basis of the second control signal received from the second controller.

Example 7. The DC-DC converter according to any one of Examples 1-6,
wherein the first switching circuit is a half bridge topology comprising a first switch and a second switch, and the second switching circuit is a half bridge topology comprising a third switch and a fourth switch;
wherein the first switching circuit is coupled to said other side of the transformer, and the second switching circuit is coupled to said side of the transformer; and
wherein the first controller is configured to:
generate a first control signal which is used for one of the third switch and the fourth switch and based on the first modulation signal and a drive signal of the first switch, and generate a first control signal which is used for the other of the third switch and the fourth switch and based on the first modulation signal and a drive signal of the second switch,
and the second controller is configured to:
generate a second control signal which is used for one of the first switch and the second switch and based on the second modulation signal and a drive signal of the third switch, and generate a second control signal which is used for the other of the first switch and the second switch and based on the second modulation signal and a drive signal of the fourth switch.

Example 8. The DC-DC converter according to any one of Examples 1-7,
wherein the first switching circuit is a half bridge topology comprising a first switch and a second switch, and the second switching circuit is a full bridge topology comprising a third switch, a fourth switch, a fifth switch and a sixth switch;
wherein the first switching circuit is coupled to said other side of the transformer, and the second switching circuit is coupled to said side of the transformer; and
wherein the first controller is configured to:
generate a first control signal which is used for one pair from the third and sixth switches and the fourth and fifth switches and based on the first modulation signal and a drive signal of the first switch, and generate a first control signal which is used for the other pair from the third and sixth switches and the fourth and fifth switches and based on the first modulation signal and a drive signal of the second switch,
and the second controller is configured to:
generate a second control signal which is used for one of the first switch and the second switch and based on the second modulation signal and a drive signal of the third switch or sixth switch, and generate a second control signal which is used for the other of the first switch and the second switch and based on the second modulation signal and a drive signal of the fourth switch or fifth switch.

Example 9. The DC-DC converter according to any one of Examples 1-8, wherein the first switching circuit is a full bridge topology comprising a first switch, a second switch, a third switch and a fourth switch, and the second switching circuit is a half bridge topology comprising a fifth switch and a sixth switch;

wherein the first switching circuit is coupled to said other side of the transformer, and the second switching circuit is coupled to said side of the transformer; and wherein the first controller is configured to:

generate a first control signal which is used for one of the fifth switch and the sixth switch and based on the first modulation signal and a drive signal of the first switch or fourth switch, and generate a first control signal which is used for the other of the fifth switch and the sixth switch and based on the first modulation signal and a drive signal of the second switch or third switch, and the second controller is configured to:

generate a second control signal which is used for one pair from the first and fourth switches and the second and third switches and based on the second modulation signal and a drive signal of the fifth switch, and generate a second control signal which is used for the other pair from the first and fourth switches and the second and third switches and based on the second modulation signal and a drive signal of the sixth switch.

Example 10. The DC-DC converter according to any one of Examples 1-9, wherein the first switching circuit is a full bridge topology comprising a first switch, a second switch, a third switch and a fourth switch, and the second switching circuit is a full bridge topology comprising a fifth switch, a sixth switch, a seventh switch and an eighth switch;

wherein the first switching circuit is coupled to said other side of the transformer, and the second switching circuit is coupled to said side of the transformer; and wherein the first controller is configured to:

generate a first control signal which is used for one pair from the fifth and eighth switches and the sixth and seventh switches and based on the first modulation signal and a drive signal of the first switch or fourth switch, and generate a first control signal which is used for the other pair from the fifth and eighth switches and the sixth and seventh switches and based on the first modulation signal and a drive signal of the second switch or third switch, and the second controller is configured to:

generate a second control signal which is used for one pair from the first and fourth switches and the second and third switches and based on the second modulation signal and a drive signal of the fifth switch or eighth switch, and generate a second control signal which is used for the other pair from the first and fourth switches and the second and third switches and based on the second modulation signal and a drive signal of the sixth switch or seventh switch.

Example 11. The DC-DC converter according to any one of Examples 1-10, wherein the functions of the first current detection module and the second current detection module are realized by duplication of the same current detection module; and/or wherein the functions of the first conversion module and the second conversion module are realized by duplication of the same conversion module; and/or wherein the functions of the first comparison module and the second comparison module are realized by duplication of the same comparison module; and/or wherein the functions of the first controller and the second controller are realized by duplication of the same controller; and/or wherein the functions of the first driver and the second driver are realized by duplication of the same driver.

Example 12. The DC-DC converter according to any one of Examples 1-11, wherein the first comparison module outputs a HIGH pulse width modulation signal as the first modulation signal if the voltage signal received from the first conversion module is greater than the reference voltage signal, and outputs a LOW pulse width modulation signal as the first modulation signal if the voltage signal is less than the reference voltage signal; and wherein the second comparison module outputs a HIGH pulse width modulation signal as the second modulation signal if the voltage signal received from the second conversion module is greater than the reference voltage signal, and outputs a LOW pulse width modulation signal as the second modulation signal if the voltage signal is less than the reference voltage signal.

Example 13. The DC-DC converter according to any one of Examples 1-12, wherein the first controller outputs a HIGH first control signal if the first modulation signal and a drive signal of at least one switch in the first switching circuit are both HIGH, and outputs a LOW first control signal if one of the first modulation signal and a drive signal of at least one switch in the first switching circuit is LOW; and wherein the second controller outputs a HIGH second control signal if the second modulation signal and a drive signal of at least one switch in the second switching circuit are both HIGH, and outputs a LOW second control signal if one of the second modulation signal and a drive signal of at least one switch in the second switching circuit is LOW.

Example 14. The DC-DC converter according to any one of Examples 1-13, wherein the first current detection module and the second current detection module comprise a current transformer, a Hall sensor or a dedicated current sampling chip.

Example 15. The DC-DC converter according to any one of Examples 1-14, wherein the first conversion module and the second conversion module comprise a diode rectification bridge or a biasing circuit.

Example 16. The DC-DC converter according to any one of Examples 1-15, wherein the first comparison module and the second comparison module comprise a comparator.

Example 17. The DC-DC converter according to any one of Examples 1-16, wherein the first controller and the second controller comprise an AND gate or a microcontroller unit.

Example 18. A bidirectional DC-DC converter, comprising:

a transformer;

a first switching circuit, coupled to the primary side of the transformer, and comprising at least two switches;

a second switching circuit, coupled to the secondary side of the transformer, and comprising at least two switches;

a first current detection module, coupled to the secondary side, and detecting a current at the secondary side;

a second current detection module, coupled to the primary side, and detecting a current at the primary side;

at least one conversion module, coupled to an output of at least one of the first current detection module and the second current detection module, and converting a signal of the current received from the first current detection module or the second current detection module to a voltage signal;

at least one comparison module, coupled to an output of the conversion module, and comparing the voltage signal with a reference voltage signal, and generating a modulation signal on the basis of the comparison result; and at least one controller, coupled to an output of the comparison module, and generating a control signal which is used for at least one switch in the second switching circuit and based on the modulation signal and a drive signal of at least one switch in the first switching circuit, or generating a control signal which is used for at least one switch in the first switching circuit and based on the modulation signal and a drive signal of at least one switch in the second switching circuit.

Example 19. The bidirectional DC-DC converter according to Example 18, further comprising at least one driver, which is coupled to the controller and drives at least one switch in the first switching circuit or the second switching circuit on the basis of the control signal received from the controller.

Example 20. The bidirectional DC-DC converter according to Example 18 or 19, wherein the drive signal of at least one switch in the first switching circuit and the drive signal of at least one switch in the second switching circuit are generated on the basis of a control signal provided by another controller, in order to drive at least one switch in the first switching circuit and at least one switch in the second switching circuit respectively.

Example 21. The bidirectional DC-DC converter according to any one of Examples 18-20, further comprising a first resonant circuit and a second resonant circuit coupled to the primary side and the secondary side respectively.

Example 22. The bidirectional DC-DC converter according to any one of Examples 18-21, wherein the at least one conversion module comprises a first conversion module and a second conversion module, the first conversion module being coupled to an output of the first current detection module and converting a signal of the current received from the first current detection module to a voltage signal, and the second conversion module being coupled to an output of the second current detection module and converting a signal of the current received from the second current detection module to a voltage signal;

wherein the at least one comparison module comprises a first comparison module and a second comparison module, the first comparison module being coupled to an output of the first conversion module, and comparing the voltage signal received from the first conversion module with the reference voltage signal and generating a first modulation signal on the basis of the comparison result, and wherein the second comparison module is coupled to an output of the second conversion module, and compares the voltage signal received from the second conversion module with the reference voltage signal and generates a second modulation signal on the basis of the comparison result; and wherein the at least one controller comprises a first controller and a second controller, the first controller being coupled to an output of the first comparison module, and generating a first control signal for at least one switch in the second switching circuit, the first control signal being based on the first modulation signal and a drive signal of at least one switch in the first switching circuit, and the second controller being coupled to an output of the second comparison module, and generating a second control signal for at least one switch in the first switching circuit, the second control signal being based on the second modulation signal and a drive signal of at least one switch in the second switching circuit, wherein the second controller stops operating when the first controller is operating, and the first controller stops operating when the second controller is operating.

Example 23. The bidirectional DC-DC converter according to any one of Examples 18-22, wherein the at least one driver comprises a first driver and a second driver, the first driver being coupled to the first controller and driving at least one switch in the second switching circuit on the basis of the first control signal received from the first controller, and the second driver being coupled to the second controller and driving at least one switch in the first switching circuit on the basis of the second control signal received from the second controller.

Example 24. The bidirectional DC-DC converter according to any one of Examples 18-23, wherein the first switching circuit is a half bridge topology comprising a first switch and a second switch, and the second switching circuit is a half bridge topology comprising a third switch and a fourth switch;

wherein the first controller is configured to:
generate a first control signal which is used for one of the third switch and the fourth switch and based on the first modulation signal and a drive signal of the first switch, and generate a first control signal which is used for the other of the third switch and the fourth switch and based on the first modulation signal and a drive signal of the second switch; and wherein the second controller is configured to:
generate a second control signal which is used for one of the first switch and the second switch and based on the second modulation signal and a drive signal of the third switch, and generate a second control signal which is used for the other of the first switch and the second switch and based on the second modulation signal and a drive signal of the fourth switch.

Example 25. The bidirectional DC-DC converter according to any one of Examples 18-24, wherein the first switching circuit is a half bridge topology comprising a first switch and a second switch, and the second switching circuit is a full bridge topology comprising a third switch, a fourth switch, a fifth switch and a sixth switch; and wherein the first controller is configured to:
generate a first control signal which is used for one pair from the third and sixth switches and the fourth and fifth switches and based on the first modulation signal and a drive signal of the first switch, and generate a first control signal which is used for the other pair from the third and sixth switches and the fourth and fifth switches and based on the first modulation signal and a drive signal of the second switch, and the second controller is configured to:
generate a second control signal which is used for one of the first switch and the second switch and based on the second modulation signal and a drive signal of the third switch or sixth switch, and generate a second control signal which is used for the other of the first switch and the second switch and based on the second modulation signal and a drive signal of the fourth switch or fifth switch.

Example 26. The bidirectional DC-DC converter according to any one of Examples 18-25, wherein the first switching circuit is a full bridge topology comprising a first switch, a second switch, a third switch and a fourth switch, and the second switching circuit is a half bridge topology comprising a fifth switch and a sixth switch; and
wherein the first controller is configured to:
generate a first control signal which is used for one of the fifth switch and the sixth switch and based on the first modulation signal and a drive signal of the first switch or fourth switch, and generate a first control signal which is used for the other of the fifth switch and the sixth switch and based on the first modulation signal and a drive signal of the second switch or third switch, and the second controller is configured to:
generate a second control signal which is used for one pair from the first and fourth switches and the second and third switches and based on the second modulation signal and a drive signal of the fifth switch, and generate a second control signal which is used for the other pair from the first and fourth switches and the second and third switches and based on the second modulation signal and a drive signal of the sixth switch.

Example 27. The bidirectional DC-DC converter according to any one of Examples 18-26,
wherein the first switching circuit is a full bridge topology comprising a first switch, a second switch, a third switch and a fourth switch, and the second switching circuit is a full bridge topology comprising a fifth switch, a sixth switch, a seventh switch and an eighth switch;
wherein the first controller is configured to:
generate a first control signal which is used for one pair from the fifth and eighth switches and the sixth and seventh switches and based on the first modulation signal and a drive signal of the first switch or fourth switch, and generate a first control signal which is used for the other pair from the fifth and eighth switches and the sixth and seventh switches and based on the first modulation signal and a drive signal of the second switch or third switch; and
wherein the second controller is configured to:
generate a second control signal which is used for one pair from the first and fourth switches and the second and third switches and based on the second modulation signal and a drive signal of the fifth switch or eighth switch, and generate a second control signal which is used for the other pair from the first and fourth switches and the second and third switches and based on the second modulation signal and a drive signal of the sixth switch or seventh switch.

Example 28. The bidirectional DC-DC converter according to any one of Examples 18-27,
wherein the first comparison module outputs a HIGH pulse width modulation signal as the first modulation signal if the voltage signal received from the first conversion module is greater than the reference voltage signal, and outputs a LOW pulse width modulation signal as the first modulation signal if the voltage signal received from the first conversion module is less than the reference voltage signal; and
wherein the second comparison module outputs a HIGH pulse width modulation signal as the second modulation signal if the voltage signal received from the second conversion module is greater than the reference voltage signal, and outputs a LOW pulse width modulation signal as the second modulation signal if the voltage signal received from the second conversion module is less than the reference voltage signal.

Example 29. The bidirectional DC-DC converter according to any one of Examples 18-28,
wherein the first controller outputs a HIGH first control signal if the first modulation signal and a drive signal of at least one switch in the first switching circuit are both HIGH, and outputs a LOW first control signal if one of the first modulation signal and a drive signal of at least one switch in the first switching circuit is LOW; and
wherein the second controller outputs a HIGH second control signal if the second modulation signal and a drive signal of at least one switch in the second switching circuit are both HIGH, and outputs a LOW second control signal if one of the second modulation signal and a drive signal of at least one switch in the second switching circuit is LOW.

Example 30. The bidirectional DC-DC converter according to any one of Examples 18-29, wherein the first current detection module and the second current detection module comprise a current transformer, a Hall sensor or a dedicated current sampling chip.

Example 31. The bidirectional DC-DC converter according to any one of Examples 18-30, wherein the first conversion module and the second conversion module comprise a diode rectification bridge or a biasing circuit.

Example 32. The bidirectional DC-DC converter according to any one of Examples 18-31, wherein the first comparison module and the second comparison module comprise a comparator.

Example 33. The bidirectional DC-DC converter according to any one of Examples 18-32, wherein the first controller and the second controller comprise an AND gate or a microcontroller unit.

Example 34. A control method, comprising:
detecting a current at a first side of a transformer in a DC-DC converter;
converting a signal of the detected current to a voltage signal;
comparing the voltage signal with a reference voltage signal, and generating a modulation signal on the basis of the comparison result;
generating a control signal for at least one switch in a switching circuit coupled to the first side of the transformer, the control signal being based on the modulation signal and a drive signal of at least one switch in a switching circuit coupled to a second side of the transformer; and
controlling the switching of at least one switch in the switching circuit at the first side on or off according to the control signal.

Example 35. The control method according to Example 34, wherein a HIGH pulse width modulation signal is generated as the modulation signal if the voltage signal is greater than the reference voltage signal, and a LOW pulse width modulation signal is outputted as the modulation signal if the voltage signal is less than the reference voltage signal.

Example 36. The control method according to Example 34 or 35, wherein a HIGH control signal is generated if the modulation signal and the drive signal are both HIGH, and a LOW control signal is generated if one of the modulation signal and the drive signal is LOW.

Example 37. The control method according to any one of Examples 34-36, further comprising:
detecting a current at a second side of the transformer in the DC-DC converter;
converting a signal of the detected second-side current to another voltage signal;
comparing the other voltage signal with another preset reference voltage signal, and generating another modulation signal on the basis of the comparison result;

generating another control signal for at least one switch in a switching circuit coupled to the second side of the transformer, the other control signal being based on the other modulation signal and a drive signal of at least one switch in the switching circuit coupled to the first side of the transformer; and controlling the switching of at least one switch in the switching circuit at the second side on or off according to the other control signal.

Although embodiments of the present invention have been described in detail above in conjunction with the drawings, it should be understood that the embodiments described above are merely configured to explain the present invention, without limiting it. A person skilled in the art could make various amendments and changes to the above embodiments without deviating from the substance and scope of the present invention. Thus, the scope of the present invention is defined only by the attached claims and their equivalent meaning.

What is claimed is:

1. A DC-DC converter, comprising:
    a transformer;
    a first switching circuit and a second switching circuit, each coupled to one of two sides of the transformer, respectively, and each comprising at least two switches;
    a first current detection module coupled to a first side of the transformer and configured to detect a current at the first side;
    a first conversion module coupled to an output of the first current detection module and configured to convert a signal of the current detected by the first current detection module to a voltage signal;
    a first comparison module coupled to an output of the first conversion module and configured to compare the voltage signal from the first conversion module with a reference voltage signal, and generate a first modulation signal based on a result of the comparison; and
    a first controller coupled to an output of the first comparison module and configured to generate a first control signal for at least one switch in the second switching circuit, the first control signal being based on the first modulation signal and a drive signal of at least one switch in the first switching circuit.

2. The DC-DC converter of claim 1, further comprising a first driver coupled to the first controller and configured to drive at least one switch in the second switching circuit based on the first control signal received from the first controller.

3. The DC-DC converter of claim 1, further comprising:
    a second current detection module coupled to a second side of the transformer and configured to detect a current at the second side;
    a second conversion module coupled to an output of the second current detection module and configured to convert a signal of the current received from the second current detection module to a voltage signal;
    a second comparison module coupled to an output of the second conversion module and configured to compare the voltage signal received from the second conversion module with the reference voltage signal, and generate a second modulation signal based on a result of the comparison; and
    a second controller coupled to an output of the second comparison module and configured to generate a second control signal for at least one switch in the first switching circuit, the second control signal being based on the second modulation signal and a drive signal of at least one switch in the second switching circuit,
    wherein the second controller stops operating when the first controller is operating, and the first controller stops operating when the second controller is operating.

4. The DC-DC converter of claim 3, further comprising a second driver coupled to the second controller and configured to drive at least one switch in the first switching circuit based on the second control signal received from the second controller.

5. The DC-DC converter of claim 3,
    wherein the first switching circuit is a half bridge topology comprising a first switch and a second switch, and the second switching circuit is a half bridge topology comprising a third switch and a fourth switch,
    wherein the first switching circuit is coupled to the second side of the transformer, and the second switching circuit is coupled to the first side of the transformer,
    wherein the first controller is configured to:
        generate a first control signal which is used for one of the third switch and the fourth switch and based on the first modulation signal and a drive signal of the first switch, and generate a first control signal which is used for the other of the third switch and the fourth switch and based on the first modulation signal and a drive signal of the second switch,
    wherein the second controller is configured to:
        generate a second control signal which is used for one of the first switch and the second switch and based on the second modulation signal and a drive signal of the third switch, and generate a second control signal which is used for the other of the first switch and the second switch and based on the second modulation signal and a drive signal of the fourth switch.

6. The DC-DC converter of claim 3,
    wherein the first switching circuit is a full bridge topology comprising a first switch, a second switch, a third switch and a fourth switch, and the second switching circuit is a full bridge topology comprising a fifth switch, a sixth switch, a seventh switch and an eighth switch,
    wherein the first switching circuit is coupled to a second side of the transformer, and the second switching circuit is coupled to the first side of the transformer,
    wherein the first controller is configured to:
        generate a first control signal which is used for one pair from the fifth and eighth switches and the sixth and seventh switches and based on the first modulation signal and a drive signal of the first switch or fourth switch, and generate a first control signal which is used for the other pair from the fifth and eighth switches and the sixth and seventh switches and based on the first modulation signal and a drive signal of the second switch or third switch,
    wherein the second controller is configured to:
        generate a second control signal which is used for one pair from the first and fourth switches and the second and third switches and based on the second modulation signal and a drive signal of the fifth switch or eighth switch, and generate a second control signal which is used for the other pair from the first and fourth switches and the second and third switches and based on the second modulation signal and a drive signal of the sixth switch or seventh switch.

7. The DC-DC converter of claim 4,
wherein functions of the first current detection module and the second current detection module are realized by duplication of a same current detection module, and/or
wherein functions of the first conversion module and the second conversion module are realized by duplication of a same conversion module, and/or
wherein functions of the first comparison module and the second comparison module are realized by duplication of a same comparison module, and/or
wherein functions of the first controller and the second controller are realized by duplication of a same controller, and/or
wherein functions of the first driver and the second driver are realized by duplication of a same driver.

8. The DC-DC converter of claim 3,
wherein the first comparison module outputs a high pulse width modulation signal as the first modulation signal if the voltage signal received from the first conversion module is greater than the reference voltage signal, and outputs a low pulse width modulation signal as the first modulation signal if the voltage signal is less than the reference voltage signal, and
wherein the second comparison module outputs a high pulse width modulation signal as the second modulation signal if the voltage signal received from the second conversion module is greater than the reference voltage signal, and outputs a low pulse width modulation signal as the second modulation signal if the voltage signal is less than the reference voltage signal.

9. The DC-DC converter of claim 3,
wherein the first controller outputs a high first control signal if the first modulation signal and a drive signal of at least one switch in the first switching circuit are both high, and outputs a low first control signal if one of the first modulation signal and a drive signal of at least one switch in the first switching circuit is low, and
wherein the second controller outputs a high second control signal if the second modulation signal and a drive signal of at least one switch in the second switching circuit are both high, and outputs a low second control signal if one of the second modulation signal and a drive signal of at least one switch in the second switching circuit is low.

10. A bidirectional DC-DC converter, comprising:
a transformer;
a first switching circuit coupled to a primary side of the transformer and comprising at least two switches;
a second switching circuit coupled to a secondary side of the transformer and comprising at least two switches;
a first current detection module coupled to the secondary side and configured to detect a current at the secondary side;
a second current detection module coupled to the primary side and configured to detect a current at the primary side;
at least one conversion module coupled to an output of at least one of the first current detection module and the second current detection module and configured to convert a signal of the current received from the first current detection module or the second current detection module to a voltage signal;
at least one comparison module coupled to an output of the conversion module and configured to compare the voltage signal with a reference voltage signal, and generate a modulation signal based on a result of the comparison; and
at least one controller coupled to an output of the comparison module and configured to generate a control signal which is used for at least one switch in the second switching circuit and based on the modulation signal and a drive signal of at least one switch in the first switching circuit, or generate a control signal which is used for at least one switch in the first switching circuit and based on the modulation signal and a drive signal of at least one switch in the second switching circuit.

11. The bidirectional DC-DC converter of claim 10, further comprising at least one driver coupled to the controller and configured to drive at least one switch in the first switching circuit or the second switching circuit based on the control signal received from the controller.

12. The bidirectional DC-DC converter of claim 10,
wherein the at least one conversion module comprises a first conversion module and a second conversion module, the first conversion module being coupled to an output of the first current detection module and configured to convert a signal of the current received from the first current detection module to a voltage signal, and the second conversion module being coupled to an output of the second current detection module and configured to convert a signal of the current received from the second current detection module to a voltage signal,
wherein the at least one comparison module comprises a first comparison module and a second comparison module, the first comparison module being coupled to an output of the first conversion module and configured to compare the voltage signal received from the first conversion module with the reference voltage signal and generate a first modulation signal on the basis of the comparison result, and wherein the second comparison module is coupled to an output of the second conversion module and configured to compare the voltage signal received from the second conversion module with the reference voltage signal and generate a second modulation signal on the basis of the comparison result, and
wherein the at least one controller comprises a first controller and a second controller, the first controller being coupled to an output of the first comparison module and configured to generate a first control signal for at least one switch in the second switching circuit, the first control signal being based on the first modulation signal and a drive signal of at least one switch in the first switching circuit, and the second controller being coupled to an output of the second comparison module and configured to generate a second control signal for at least one switch in the first switching circuit, the second control signal being based on the second modulation signal and a drive signal of at least one switch in the second switching circuit,
wherein the second controller stops operating when the first controller is operating, and the first controller stops operating when the second controller is operating.

13. The bidirectional DC-DC converter of claim 12, wherein the at least one driver comprises a first driver and a second driver, the first driver being coupled to the first controller and configured to drive at least one switch in the second switching circuit based on the first control signal received from the first controller, and the second driver being coupled to the second controller and configured to drive at least one switch in the first switching circuit based on the second control signal received from the second controller.

14. The bidirectional DC-DC converter of claim 12,
wherein the first switching circuit is a half bridge topology comprising a first switch and a second switch, and the second switching circuit is a half bridge topology comprising a third switch and a fourth switch;
wherein the first controller is configured to:
generate a first control signal which is used for one of the third switch and the fourth switch and based on the first modulation signal and a drive signal of the first switch, and generate a first control signal which is used for the other of the third switch and the fourth switch and based on the first modulation signal and a drive signal of the second switch, and
wherein the second controller is configured to:
generate a second control signal which is used for one of the first switch and the second switch and based on the second modulation signal and a drive signal of the third switch, and generate a second control signal which is used for the other of the first switch and the second switch and based on the second modulation signal and a drive signal of the fourth switch.

15. The bidirectional DC-DC converter of claim 12,
wherein the first switching circuit is a full bridge topology comprising a first switch, a second switch, a third switch and a fourth switch, and the second switching circuit is a full bridge topology comprising a fifth switch, a sixth switch, a seventh switch and an eighth switch;
wherein the first controller is configured to:
generate a first control signal which is used for one pair from the fifth and eighth switches and the sixth and seventh switches and based on the first modulation signal and a drive signal of the first switch or fourth switch, and generate a first control signal which is used for the other pair from the fifth and eighth switches and the sixth and seventh switches and based on the first modulation signal and a drive signal of the second switch or third switch, and
wherein the second controller is configured to:
generate a second control signal which is used for one pair from the first and fourth switches and the second and third switches and based on the second modulation signal and a drive signal of the fifth switch or eighth switch, and generate a second control signal which is used for the other pair from the first and fourth switches and the second and third switches and based on the second modulation signal and a drive signal of the sixth switch or seventh switch.

16. The bidirectional DC-DC converter of claim 12,
wherein the first comparison module outputs a high pulse width modulation signal as the first modulation signal if the voltage signal received from the first conversion module is greater than the reference voltage signal, and outputs a low pulse width modulation signal as the first modulation signal if the voltage signal received from the first conversion module is less than the reference voltage signal, and
wherein the second comparison module outputs a high pulse width modulation signal as the second modulation signal if the voltage signal received from the second conversion module is greater than the reference voltage signal, and outputs a low pulse width modulation signal as the second modulation signal if the voltage signal received from the second conversion module is less than the reference voltage signal.

17. The bidirectional DC-DC converter of claim 12,
wherein the first controller outputs a high first control signal if the first modulation signal and a drive signal of at least one switch in the first switching circuit are both high, and outputs a low first control signal if one of the first modulation signal and a drive signal of at least one switch in the first switching circuit is low, and
wherein the second controller outputs a high second control signal if the second modulation signal and a drive signal of at least one switch in the second switching circuit are both high, and outputs a low second control signal if one of the second modulation signal and a drive signal of at least one switch in the second switching circuit is low.

18. A control method, comprising:
detecting a current at a first side of a transformer in a DC-DC converter;
converting a signal of the detected current to a voltage signal;
comparing the voltage signal with a reference voltage signal, and generating a modulation signal based on a result of the comparison;
generating a control signal for at least one switch in a switching circuit coupled to the first side of the transformer, the control signal being based on the modulation signal and a drive signal of at least one switch in a switching circuit coupled to a second side of the transformer; and
controlling the switching of at least one switch in the switching circuit at the first side on or off according to the control signal.

19. The control method of claim 18, wherein a high pulse width modulation signal is generated as the modulation signal if the voltage signal is greater than the reference voltage signal, and a low pulse width modulation signal is outputted as the modulation signal if the voltage signal is less than the reference voltage signal.

20. The control method of claim 18, wherein a high control signal is generated if the modulation signal and the drive signal are both high, and a low control signal is generated if one of the modulation signal and the drive signal is low.

21. The control method of claim 18, further comprising:
detecting a current at the second side of the transformer in the DC-DC converter;
converting a signal of the detected second-side current to another voltage signal;
comparing the other voltage signal with another preset reference voltage signal, and generating another modulation signal based on a result of the comparison;
generating another control signal for at least one switch in the switching circuit coupled to the second side of the transformer, the other control signal being based on the other modulation signal and a drive signal of at least one switch in the switching circuit coupled to the first side of the transformer; and
controlling the switching of at least one switch in the switching circuit at the second side on or off according to the other control signal.

* * * * *